US008300048B2

(12) United States Patent
Hayashi et al.

(10) Patent No.: US 8,300,048 B2
(45) Date of Patent: Oct. 30, 2012

(54) THREE-DIMENSIONAL SHAPE DATA RECORDING/DISPLAY METHOD AND DEVICE, AND THREE-DIMENSIONAL SHAPE MEASURING METHOD AND DEVICE

(75) Inventors: Toshihiro Hayashi, Tokyo (JP); Yukihiro Kawano, Tokyo (JP); Hideo Terada, Tokyo (JP)

(73) Assignee: IHI Corporation, Tokyo (JP)

( * ) Notice: Subject to any disclaimer, the term of this patent is extended or adjusted under 35 U.S.C. 154(b) by 635 days.

(21) Appl. No.: 12/096,871

(22) PCT Filed: Dec. 15, 2006

(86) PCT No.: PCT/JP2006/325042
§ 371 (c)(1),
(2), (4) Date: Jun. 10, 2008

(87) PCT Pub. No.: WO2007/069721
PCT Pub. Date: Jun. 21, 2007

(65) Prior Publication Data
US 2009/0184961 A1    Jul. 23, 2009

(30) Foreign Application Priority Data
Dec. 16, 2005  (JP) ................................. 2005-363295

(51) Int. Cl.
*G06T 17/00* (2006.01)
(52) U.S. Cl. ..................................................... 345/424
(58) Field of Classification Search .................. 345/419, 345/653, 664, 679
See application file for complete search history.

(56) References Cited

U.S. PATENT DOCUMENTS

| 5,123,084 | A | * | 6/1992  | Prevost et al. ................ 345/420 |
| 5,583,975 | A | * | 12/1996 | Naka et al. ..................... 345/426 |
| 5,689,629 | A | * | 11/1997 | Lee ............................... 345/427 |
| 5,724,493 | A | * | 3/1998  | Hosoya et al. ................. 345/424 |
| 6,026,189 | A | * | 2/2000  | Greenspan ..................... 382/226 |
| 6,064,942 | A | * | 5/2000  | Johnson et al. ............... 701/213 |

(Continued)

FOREIGN PATENT DOCUMENTS
JP        63-186308         8/1988
(Continued)

OTHER PUBLICATIONS

Li et al., A Survey of Maneuvering Target Tracking—Part III: Measurement Models, Jul.-Aug. 2001, Proceedings of SPIE Conference on Signal and Data Processing of Small Targets, pp. 1-24.*

(Continued)

*Primary Examiner* — Ulka Chauhan
*Assistant Examiner* — Anh-Tuan V Nguyen
(74) *Attorney, Agent, or Firm* — Griffin & Szipl, P.C.

(57) ABSTRACT

A three-dimensional shape data recording/display method including: a data inputting step S1 for inputting into a computer coordinate values on a three-dimensional shape; a model structuring step S3 for structuring an environment model for partitioning a spatial region into a plurality of voxels made from rectangular solids, of which the boundary surfaces are mutually perpendicular, and stores the positions of the individual voxels; a matching step S4 for setting and recording a representative point and an error distribution within the voxel corresponding to the coordinate value; a model updating step S5 for updating the environment model; and an outputting step S6 for outputting, to an outputting device, at least one of the voxel position, representative point, and error distribution.

25 Claims, 14 Drawing Sheets

U.S. PATENT DOCUMENTS

| | | | |
|---|---|---|---|
| 6,256,036 B1 * | 7/2001 | Matsumoto | 345/419 |
| 6,363,169 B1 * | 3/2002 | Ritter et al. | 382/154 |
| 6,476,803 B1 * | 11/2002 | Zhang et al. | 345/419 |
| 6,809,728 B2 * | 10/2004 | Terauchi et al. | 345/420 |
| 6,914,601 B2 * | 7/2005 | Fujiwara et al. | 345/424 |
| 7,120,519 B2 | 10/2006 | Okabayashi et al. | |
| 7,317,456 B1 * | 1/2008 | Lee | 345/427 |
| 7,653,235 B2 * | 1/2010 | Mylaraswamy et al. | 382/141 |
| 7,696,894 B2 * | 4/2010 | Fiegert et al. | 340/686.1 |
| 7,843,512 B2 * | 11/2010 | Mohamed et al. | 348/700 |
| 2005/0068317 A1 | 3/2005 | Amakai | |
| 2005/0226331 A1 | 10/2005 | Mohamed et al. | |
| 2006/0017720 A1 * | 1/2006 | Li | 345/419 |
| 2007/0276225 A1 | 11/2007 | Kaufman et al. | |

FOREIGN PATENT DOCUMENTS

| | | | |
|---|---|---|---|
| JP | 3-170345 A | 7/1991 | |
| JP | 5-314244 B2 | 11/1993 | |
| JP | 06-018221 | 1/1994 | |
| JP | 9-81788 | 3/1997 | |
| JP | 09-229648 | 9/1997 | |
| JP | 2000-113193 | 4/2000 | |
| JP | 2001-022939 | 1/2001 | |
| JP | 3170345 | 3/2001 | |
| JP | 2001-236522 | 8/2001 | |
| JP | 2003-015739 | 1/2003 | |
| JP | 2003-296755 | 10/2003 | |
| JP | 2004-521423 A | 7/2004 | |
| JP | 2005-037379 | 2/2005 | |
| WO | 02/073540 A1 | 9/2002 | |

OTHER PUBLICATIONS

Kiyohide, Sekimoto, et al. "Development of 3D Laser Radar for Traffic Monitoring," Ishikawajima-Harima Engineering Review, vol. 43, No. 4, (Jul. 2003), pp. 114-117.

Thrun, Sebastian, "Learning Occupancy Grid Maps with Forward Sensor Models," School of Computer Science, Carnegie Melon Univeristy, pp. 1-28, 2003.

International Search Report issued in corresponding application No. PCT/JP2006/325042, completed Feb. 19, 2007 and mailed Feb. 27, 2007.

Nuechter, Andreas et al., "6D SLAM with an Application in Autonomous Mine Mapping," IEEE 2004 International Conference on Robotics and Automation, Apr. 2004.

Besl, Paul et al., "A Method for Registration of 3-D Shapes," IEEE Transactions on Pattern Analysis and Machine Intelligence, vol. 14, No. 2, Feb. 1992, pp. 239-256.

Masuda, Takeshi et al., "A Survey of Shape Model Generation from Multiple Range Images," Joho Shori Gakkai Kenkyu Hokoku, vol. 2004, No. 113, 2004, pp. 1-13.

Office Action issued in co-pending related U.S. Appl. No. 12/096,851 on Jul. 14, 2011.

Office Action issued in co-pending related U.S. Appl. No. 12/096,830 on Aug. 8, 2011.

\* cited by examiner

ERROR DISTRIBUTION OF MEASURED DATA

VALUE IN VOXEL SHOWS PROBABILITY VALUE

CASE WHERE ERROR DISTRIBUTIONS INTERSECT

FIG.15
(A)
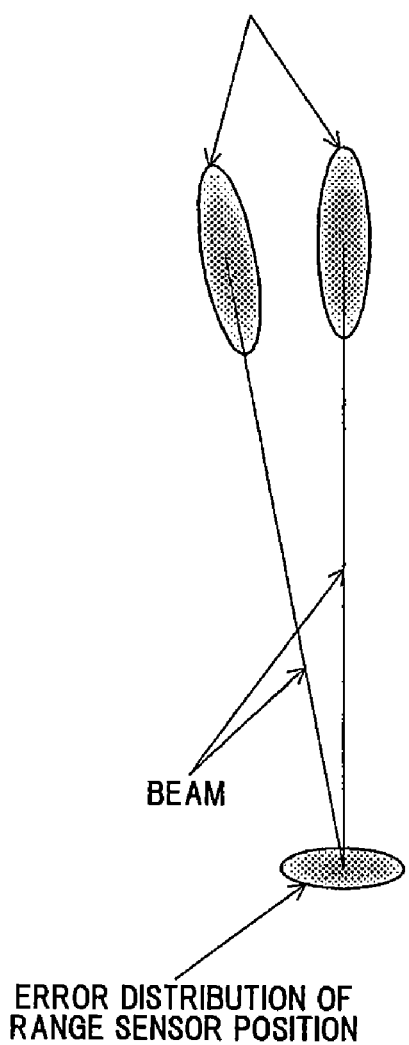
ERROR DISTRIBUTION OF MEASURED DATA
BEAM
ERROR DISTRIBUTION OF RANGE SENSOR POSITION
⇒ COMBINE ERROR DISTRIBUTIONS
(B)
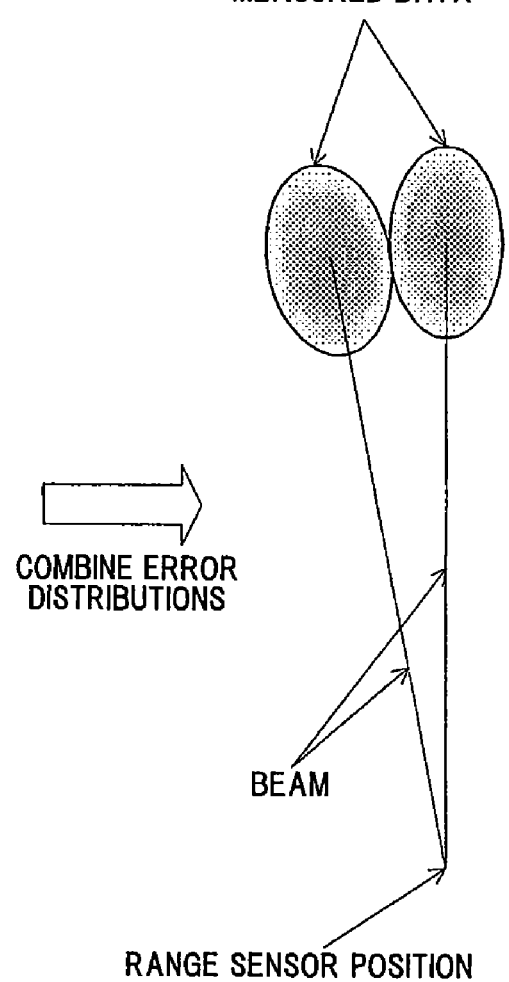
ERROR DISTRIBUTION OF MEASURED DATA
BEAM
RANGE SENSOR POSITION

US 8,300,048 B2

THREE-DIMENSIONAL SHAPE DATA RECORDING/DISPLAY METHOD AND DEVICE, AND THREE-DIMENSIONAL SHAPE MEASURING METHOD AND DEVICE

This is a National Phase Application in the United States of International Patent Application No. PCT/JP2006/325042 filed Dec. 15, 2006, which claims priority on Japanese Patent Application No. 363295/2005, filed Dec. 16, 2005. The entire disclosures of the above patent applications are hereby incorporated by reference.

BACKGROUND OF THE INVENTION

1. Technical Field of the Invention

The present invention relates to a three-dimensional shape data recording/displaying method and device, and to a three-dimensional shape measuring method and device, for measuring a non-moving three-dimensional shape from a plurality of measuring positions, and for combining and restoring the distance data thereof.

2. Description of the Related Art

Three-dimensional shape measuring technologies are becoming more prevalent, and three-dimensional shape data is used in a variety of application fields, such as measuring shapes in machine components/workpieces, automatic position identification in mobile robots, and topographical and structural measurements, and the like.

Conventionally, point sets, range imagery, surfaces, voxel structures, and the like, have been used as three-dimensional shape data recording/displaying methods and devices.

Point sets express shapes by coordinate values of measured points, which are sensor measured data. Additionally, range imagery expresses shapes by maintaining range values, in the depth direction, for each picture element of a two-dimensional image. Surfaces express the surface shapes of objects through assembling together triangular shapes. Voxel structures are structures in which a space is divided into small rectangular solids, and shape information is held within each voxel.

The measured data in three-dimensional shape measuring is expressed in polar coordinate values (r, θ, φ), with the measuring position being the origin, for example. In the present invention, this data is known as "range data."

There are the following problems when non-moving three-dimensional shapes are reproduced through integrating range data from a plurality of positions.

When point sets are used, the amount of data increases proportionately with the measured data. Consequently, the total data size is excessive when the object being measured is large. Because of this, this is not practical as a data structure for expressing shapes.

When range imagery is used, the measurement is from one direction, and the greater the distance, the wider the spacing of the picture elements, and the less the resolution. Moreover, because this can express data from only one direction, this technology is not directed at integrating measurement results from a plurality of observation points.

When surfaces are used, high-speed processing is difficult due to the need for complex processing in the integration thereof.

In contrast, the voxel structure has the benefits of having a constant data size, being able to integrate data from a plurality of observation points, and not requiring complex calculations to integrate the data, and is the most suited to reproduction through integrating range data from a plurality of positions.

Moreover, Japanese Patent 3170345 and Japanese Unexamined Patent Application Publication JP09-81788A, and non-patent document "Learning Occupancy GridMaps with Forward Sensor Models" by Sebastian Thrun, have disclosed improved voxel structures.

In Japanese Patent 3170345, a method known as "voxel voting" is used to poll the measurement results at each voxel, to integrate three-dimensional shapes from a plurality of observation points. Furthermore, this method discloses a method for controlling data hierarchically through further oct tree partitioning of voxels for voxels unable to obtain adequate resolution.

Japanese Unexamined Patent Application Publication JP09-81788A proposes means for accumulating probability values for each voxel. With these means, the environment model is integrated independent of frequency through the application of probabilities, enabling the creation of accurate environment models.

Non-patent document "Learning Occupancy Grid Maps with Forward Sensor Models" by Sebastian Thrun, while envisioning planar surfaces, proposes a method for restoring, to correct values, incorrect voxel probability values that have occurred due to errors in the measured data of voxels that hold probability values.

Additionally, non-patent document "Development of a Three-Dimensional Laser Radar," by Sekimoto Kiyohide, et al., Ishikawajima-Harima Engineering Review, vol. 43, No. 4 (2003-7), disclosed a technology relating to the present invention.

The voxel structure of Japanese Patent 3170345 repetitively divides voxels in order to obtain the correct shapes, but there is a problem in that the data size increases when the number of partitions is increased. Because of this, typically the depth of partitioning is fixed, so there is a limit on the resolution. That is, resolutions in excess of the size of the voxels after partitioning cannot be expressed. Additionally, voxels wherein errors have occurred due to data that contains errors exist as is. Because of this, data that contains errors cannot be handled.

The voxel structure of Japanese Unexamined Patent Application Publication JP09-81788A expresses shape using probability values, but when the data contains error, as with Japanese Patent 3170345, the voxel wherein the error has occurred remains as is. Because of this, data that contains errors cannot be handled.

The voxel structure of non-patent document "Learning Occupancy Grid Maps with Forward Sensor Models" by Sebastian Thrun includes a probability decreasing process, and thus has a function for eliminating voxels that have incorrect probability values. However, typically voxels contain both regions wherein measurement objects exist and regions wherein measurement objects do not exist, so there is a problem of non-convergence to the correct shape even when a plurality of measurements is integrated.

SUMMARY OF THE INVENTION

The present invention was invented to resolve the problems described above. That is, the object of the present invention is to provide a three-dimensional shape data recording/displaying method and device, and a three-dimensional shape measuring method and device, able to integrate range data from a plurality of positions to reproduce a non-moving three-dimensional shape, and able to increase resolution without greatly increasing the data size.

The present invention provides a three-dimensional shape data recording/displaying method for reproducing a three-dimensional shape from coordinate values of measured points on a three-dimensional shape, comprising: a data inputting step for inputting, into a computer, coordinate values on a three-dimensional shape; a model structuring step for structuring an environment model that partitions a spatial region, in which the three-dimensional shape exists, into a plurality of voxels formed from rectangular solids, of which the boundary surfaces are mutually perpendicular, and stores the positions of the individual voxels; a matching step for setting, and recording a representative point and an error distribution thereof, within the voxel corresponding to the coordinate value; and an outputting step for outputting, to an outputting device, the voxel position, the representative point, and the error distribution.

Additionally, the present invention provides a three-dimensional shape measuring method for reproducing a three-dimensional shape from coordinate values of measuring points on a three-dimensional shape and for outputting three-dimensional shape data, comprising: a data inputting step for inputting, into a computer, coordinate values on a three-dimensional shape; a model structuring step for structuring an environment model for partitioning a spatial region, in which the three-dimensional shape exists, into a plurality of voxels formed from rectangular solids, of which the boundary surfaces thereof are perpendicular, and stores the positions of the individual voxels; a matching step for setting, and recording a representative point and an error distribution thereof, within the voxel corresponding to the coordinate value; and an outputting step for outputting, to an outputting device, at least one of the representative point, the voxel position, and the error distribution.

The three-dimensional shape data recording/displaying method or three-dimensional shape measuring method may include the following detail.

In the model structuring step in a preferred embodiment of the present invention, the largest voxel is set to a size corresponding to the minimum required resolution, and when a plurality of measuring points exists within a single voxel, the voxel is further partitioned hierarchically into a plurality of voxels so that only a single measuring point exists within a single voxel.

Furthermore, the three-dimensional shape data recording/displaying method or three-dimensional shape measuring method comprises, after the matching step: a model updating step for updating the environment model; wherein the model updating step comprises: retrieving a voxel corresponding to the coordinate value of a newly inputted measuring point; and assuming that no object exists between the origin and the measuring point, resetting or eliminating the representative point and error distribution in a voxel positioned therebetween.

Furthermore, the three-dimensional shape data recording/displaying method or three-dimensional shape measuring method comprises, after the matching step; a model updating step for updating the environment model; wherein the model updating step comprises: retrieving a voxel corresponding to the coordinate value of a newly inputted measuring point; and setting the coordinate value and the error distribution as the coordinate value and error distribution of the representative point if there is no representative point within the voxel.

Furthermore, the three-dimensional shape data recording/displaying method or three-dimensional shape measuring method comprises, after the matching step: a model updating step for updating the environment model; wherein the model updating step comprises: retrieving a voxel corresponding to the coordinate value of a newly inputted measuring point; comparing a newly obtained error distribution and the error distribution already set within the voxel if there is a representative point that has already been set within the voxel; resetting a new error distribution and a new representative point from both of the error distributions or from both of the error distributions and the representative point already set within the voxel and the coordinate values of the measured point newly inputted if the error distributions are mutually overlapping; and if the error distributions are not mutually overlapping, further partitioning hierarchically the voxel into a plurality of voxels so that only a single representative point exists within a single voxel. An oct tree or a K-D tree is used for the voxel partitioning.

Moreover, preferably the voxel holds a probability value in addition to the representative point and error distribution.

Furthermore, in the data inputting step, a range sensor is used to sequentially obtain, as range data having an arbitrary measuring position as the origin, coordinate values on the three-dimensional shape while moving the origin.

Furthermore, when a position of the range sensor and an error distribution are obtained, preferably the error distribution of the position of the range sensor is combined with the error distribution of the measured data.

Additionally, in the model updating step, the newly obtained error distribution and the error distribution that has already been set within the voxel are compared; and if the error distributions are mutually overlapping, then when, as the result of resetting a new error distribution and a new representative point from both of the error distributions, the new representative point has moved into another voxel, then: if there is no representative point in the another voxel, then the new error distribution and new representative point are set into the another voxel; if there is a representative point that has already been set in the another voxel, then the new error distribution and the error, distribution that has already been set into the another voxel are compared; and (A) if the error distributions are mutually overlapping, then a new error distribution and a new representative point are reset from both error distributions or from both error distributions and the representative point that has already been set within the voxel and the new representative point; or (B) if the error distributions are not mutually overlapping, the voxel is further partitioned hierarchically into a plurality of voxels so that only a single representative point exists within a single voxel.

In a preferred embodiment of the present invention there is, after the matching step, a model updating step for updating the environment model, wherein: in the model updating step, a new representative point and error distribution are obtained and reset through a Kalman filter from the newly inputted measured point coordinate value and the error distribution thereof, and the representative point and the error distribution thereof that have already been set in the voxel.

In the outputting step, not only is the position of the representative point of the voxel outputted to the outputting device as the three-dimensional shape measurement value, but also an index indicating the reliability or accuracy of the measurement value is outputted to the outputting device based on the magnitude of the error distribution within the voxel.

In the outputting step, when the position of the representative point of the voxel is outputted to the outputting device as the three-dimensional shape measurement value, if the magnitude of the error distribution within the voxel is larger than a specific reference value, then the reliability or accuracy of the measurement value is regarded to be less than a specific reference, and the measurement value for the voxel is not outputted to the outputting device.

After the matching step, there is a model updating step for updating the environment model. In the model updating step, a voxel corresponding to the coordinate value of the newly inputted measured point is retrieved; and if at least one of the representative point and the error distribution within that voxel is newly set, or reset, or the voxel is further partitioned hierarchically into a plurality of voxels, then, in the outputting step, the position of the representative point of that voxel is outputted to the outputting device as a three-dimensional shape measurement value.

In the outputting step, the position of a representative point for a voxel in the environment model in a scope for which the position can be measured from the position of the range sensor is outputted to the outputting device as a three-dimensional shape measurement value.

Moreover, the present invention provides a three-dimensional shape data recording/displaying device for reproducing a three-dimensional shape from coordinate values of measured points on a three-dimensional shape, comprising: a data inputting device for inputting, into a computer, coordinate values on a three-dimensional shape; a model structuring device for structuring an environment model that partitions a spatial region, in which the three-dimensional shape exists, into a plurality of voxels formed from rectangular solids, of which the boundary surfaces thereof are perpendicular, and stores the positions of the individual voxels; a matching device for setting and recording a representative point and an error distribution thereof, within a voxel corresponding to a coordinate value; and a data transferring device for outputting, to an outputting device, the voxel position, representative point, and error distribution.

Additionally, the present invention provides a three-dimensional shape measuring device for reproducing a three-dimensional shape from coordinate values of measuring points on a three-dimensional shape and for outputting three-dimensional shape data, comprising: a data inputting device for inputting, into a computer, coordinate values on a three-dimensional shape; a model structuring device for structuring an environment model that partitions a spatial region, in which the three-dimensional shape exists, into a plurality of voxels formed from rectangular solids, of which the boundary surfaces thereof are perpendicular, and stores the positions of the individual voxels; a matching device for setting and recording a representative point and an error distribution thereof, within a voxel corresponding to a coordinate value; and a data transferring device for outputting, to an outputting device, at least one of the representative point, voxel position, and error distribution.

The three-dimensional shape data recording/displaying device or three-dimensional shape measuring device may include the following detail.

In the model structuring step in a preferred embodiment of the present invention, the largest voxel is set to a size corresponding to the minimum required resolution, and when a plurality of measuring points exists within a single voxel, the voxel is further partitioned hierarchically into a plurality of voxels so that only a single measuring point exists within a single voxel.

In a preferred embodiment of the present invention, the three-dimensional shape data recording/displaying device or three-dimensional shape measuring device comprises: a model updating device for updating the environment model after the matching device sets and records a representative point and an error distribution thereof, within the voxel corresponding to the coordinate value, wherein: the model updating device retrieves a voxel corresponding to the coordinate value of a newly inputted measured point; and assumes that no object exists between the origin and the measuring point, and resets or eliminates the representative point and error distribution in a voxel positioned therebetween.

In a preferred embodiment of the present invention, the three-dimensional shape data recording/displaying device or three-dimensional shape measuring device comprises a model updating device for updating the environment model after the matching device sets and records a representative point and an error distribution thereof, within the voxel corresponding to the coordinate value, wherein: the model updating device retrieves a voxel corresponding to the coordinate value of a newly inputted measured point; and when there is no representative point within the voxel, sets the coordinate value and the error distribution as the coordinate value and error distribution of the representative point.

In a preferred embodiment of the present invention, the three-dimensional shape data recording/displaying device or three-dimensional shape measuring device comprises a model updating device for updating the environment model after the matching device sets and records a representative point and an error distribution thereof, within the voxel corresponding to the coordinate value, wherein: the model updating device retrieves a voxel corresponding to the coordinate value of a newly inputted measured point; when there is a representative point that has already been set within the voxel, compares a newly obtained error distribution and the error distribution already set within the voxel; if the error distributions are mutually overlapping, resets a new error distribution and a new representative point from both of the error distributions, or from both of the error distributions and the representative point already set within the voxel and the coordinate values of the measured point newly inputted; and if the error distributions are not mutually overlapping, then further partitions hierarchically the voxel into a plurality of voxels so that only a single representative point exists within a single voxel.

In a preferred embodiment of the present invention, the matching device records a voxel probability value within the voxel together with and in addition to the representative point and the error distribution.

In a preferred embodiment of the present invention, the three-dimensional shape data recording/displaying device or three-dimensional shape measuring device is provided with a range sensor for sequentially obtaining, as range data having an arbitrary measured position as the origin, coordinate values on the three-dimensional shape while moving the origin.

In a preferred embodiment of the present invention, when a position and an error distribution of the range sensor and are obtained, preferably the matching device combines the error distribution of the position of the range sensor with the error distribution of the measured data.

In a preferred embodiment of the present invention, the model updating device: compares a newly obtained error distribution with an error distribution that has already been set within a voxel; if the error distributions are mutually overlapping, then if, as the result of resetting a new error distribution and a new representative point from both error distributions, or from both error distributions and a distribution point that has already been set within a voxel and a coordinate value for a newly inputted measured point, the representative point moves to another voxel, then: if there is no representative point in the another voxel, then sets the new error distribution and new representative point into the another voxel; and if there is a representative point that has already been set in the another voxel, then compares the new error distribution and the error distribution that has already been set into the another voxel; and (A) if the error distributions are mutually overlapping, then resets a new error distribution and a new representative point from both error distributions, or from both error distributions and the representative point that has already been set within the voxel and the new representative point; or (B) if the error distributions are not mutually overlapping, further partitions hierarchically the voxel into a plurality of voxels so that only a single representative point exists within a single voxel.

In a preferred embodiment of the present invention, the three-dimensional shape data recording/displaying device or three-dimensional shape measuring device comprises a model updating device for updating the environment model after the matching step, wherein: —the model updating device obtains and resets a new representative point and error distribution through a Kalman filter from the newly inputted measured point coordinate value and the error distribution thereof, and the representative point and the error distribution thereof that have already been set in the voxel.

The data transferring device not only outputs the position of the representative point of the voxel to the outputting device as the three-dimensional shape measurement value, but also outputs an index indicating the reliability or accuracy of the measurement value to the outputting device based on the magnitude of the error distribution within the voxel.

When the position of the representative point of the voxel is outputted to the outputting device as the three-dimensional shape measurement value, if the magnitude of the error distribution within the voxel is larger than a specific reference value, then the reliability or accuracy of the measurement value is regarded to be less than a specific reference, the data transferring device does not output the measurement value for the voxel to the outputting device.

After the matching device there is a model updating device for updating the environment model. In the model updating device, a voxel corresponding to the coordinate value of the newly inputted measured point is retrieved; if at least one of the representative point and the error distribution within that voxel is newly set, or reset, or that voxel is further partitioned hierarchically into a plurality of voxels, then, the outputting device outputs the position of the representative point of that voxel, to an outputting device as a three-dimensional shape measurement value.

The outputting device outputs the position of a representative point for a voxel in the environment model in a scope for which the position can be measured from the position of the range sensor to an outputting device as a three-dimensional shape measurement value.

The method and device as set forth in the present invention, as described above, partition a spatial region in which a three-dimensional shape exists into a plurality of voxels and record the position of each voxel, so that when the object to be measured is large, the data size is kept small in proportion to the number of voxels.

Additionally, a representative point and an error distribution thereof are set and recorded within a voxel corresponding to a coordinate value, enabling the display of data at greater than the voxel resolution.

Additionally, in the model structuring step, the largest voxel is set to a size corresponding to the minimum required resolution, and when a plurality of measuring points exists within a single voxel, the voxel is further partitioned hierarchically into a plurality of voxels so that only a single measuring point exists within a single voxel making it possible to simultaneously suppress the data size and further increase the resolution through the use of the voxels and representative points after partitioning.

In particular, by obtaining a plurality of coordinate values on a three-dimensional shape as range data with a plurality of measuring positions as the origin and using the coordinate values of the range data as the coordinate values of the representative points and using the measurement error of the coordinate values of the range data as the error distribution of the representative points, precise coordinate values and error distributions can be used to combine a plurality of measurements statistically, enabling further increased accuracy.

Furthermore, assuming that no object exists between the origin and the measured point, representative points and error distributions within the voxels positioned therebetween are eliminated, the influence of erroneous measured data can be eliminated.

Additionally, by retrieving the voxel that corresponds to the coordinate value of a newly inputted measured point, and setting the coordinate value and the error distribution as the coordinate value and error distribution of the representative point when there is no representative point in the voxel, the coordinate value and error distribution of the representative point can be set easily.

Furthermore, when there is a representative point that has already been set within the voxel, a newly obtained error distribution and the error distribution already set within the voxel are compared; and if the error distributions are mutually overlapping, a new error distribution and a new representative point are reset from both of the error distributions, or from both of the error distributions and the representative point already set within the voxel and the coordinate values of the measured point newly inputted; and if the error distributions are not mutually overlapping, then the voxel is further partitioned hierarchically into a plurality of voxels so that only a single representative point exists within a single voxel, thereby making it possible to cause convergence to a high accuracy shape while avoiding the accumulation of error.

In particular, when the error distributions are mutually overlapping, if as the result of resetting a new error distribution and a new representative point, the representative point moves to another voxel, by further comparing to the error distribution that has already been set within that voxel, the preservation of consistency so that only a single representative point will exist within a single voxel can be achieved.

According to the method and device as set forth in the present invention, as described above, not only is there a function for correcting, to correct data, range data that includes error, but also this function is repeated, causing convergence to a highly accurate shape in measurements over extended periods of time. Furthermore, the method as set forth in the present invention has a low calculation amount because it is a process that updates representative points, which correspond to the individual voxels, and the error distributions thereof, by new measured points. Furthermore, the calculation is closed within a voxel, having no influence on the surrounding voxels, enabling high-speed processing. Additionally, the measured data can be integrated sequentially into voxel structures wherein the largest voxels have resolutions at the minimum requirements, so the memory size does not greatly rise above a fixed size.

Furthermore, having probability values for each voxel enables the determination of a probability value for a given voxel without recalculating, from the error distribution, whether or not an object exists in the voxel by discovering a voxel that contains a representative point, even when the error distribution is wider than that of the voxel that contains the representative point.

Moreover, even when there is error in the sensor position and orientation, this error distribution is combined with the error distribution of the measured data to calculate an absolute error of the measured data, enabling an increase in the positional accuracy of the target object.

Furthermore, a new representative point and error distribution are obtained and reset in the model updating step through a Kalman filter from a newly inputted measured point coordinate value and the error distribution thereof, and the representative point and the error distribution thereof that have already been set in the voxel, enabling the obtaining of a shape that is nearer to the true value.

In particular, by repeating the model updating step that uses the Kalman filter, the effect of the Kalman filter produces a highly accurate shape that converges on the true value, even if the data contains error.

Furthermore, in the outputting step, the position of the representative point of the voxel is outputted to the outputting device as the three-dimensional shape measurement value, and an index indicating the reliability or accuracy of the measurement value is outputted to the outputting device based on the magnitude of the error distribution within the voxel, so as to enable the user to opt to delete measured values that have low reliability, depending on the details of the application, when using the measurement device.

Moreover, in the outputting step, when the position of the representative point of the voxel is outputted to the outputting device as the three-dimensional shape measurement value, if the magnitude of the error distribution within the voxel is larger than a specific reference value, then the reliability or accuracy of the measurement value is regarded to be less than a specific reference, and the measurement value for the voxel is not outputted to the outputting device, so that it is possible to reduce the size of the data that is handled and increase the reliability because, when using the measuring device, it is possible to handle only the measurement values that have high reliability to begin with.

Furthermore, in the data inputting step, the use of the range sensor to sequentially obtain, as range data having an arbitrary measuring position as the origin, three-dimensional shape coordinate values while moving the origin, and in particular, obtaining range data from different directions, enables the integration of range data of error distributions with different distribution shapes, thereby enabling increased accuracy.

Furthermore after the matching step, there is a model updating step for updating the environment model. In the model updating step, a voxel corresponding to the coordinate value of a newly inputted measured point is retrieved, and then only when at least one of the representative point and the error distribution within that voxel is newly set, or reset, or that voxel is further partitioned hierarchically into a plurality of voxels, then, in the outputting step, at least one of the position of the representative point, the error distribution, and the position of that voxel is outputted to the outputting device as a three-dimensional shape measurement value, so that the value of a representative point, or the like, within the voxel that has been affected by the measured point newly obtained from the range sensor to be outputted. Because of this, the user, while envisioning operation that is identical to that which is conventional, is able to use the equipment so as to replace the original measurement values obtained from the range sensor with what appears to be measurement values of higher accuracy. Three-dimensional shape measurements with increased accuracy are enabled in this way.

Furthermore, in the outputting step, outputting the position of a representative point for a voxel in the environment model in a scope for which the position can be measured from the position of the range sensor to an outputting device as a three-dimensional shape measurement value enables the use of what acts as a range sensor with higher accuracy and higher resolution, even with the rough resolution of the measurement values of a conventional range sensor. This enables three-dimensional shape measurements with increased accuracy.

Other objects and beneficial aspects of the present invention will become clear from the description below, which references the attached drawings.

BRIEF DESCRIPTION OF THE DRAWINGS

FIG. 15 is a schematic diagram of combining the error distribution of the range sensor position and the error distribution of the measured data, and calculating the absolute error of measured data.

DETAILED DESCRIPTION OF THE PREFERRED EMBODIMENTS

A preferred embodiment of the present invention will be explained below in reference to the drawings. Note that in each drawing, common portions are assigned numerical reference, and redundant explanations are omitted.

Figure 1:
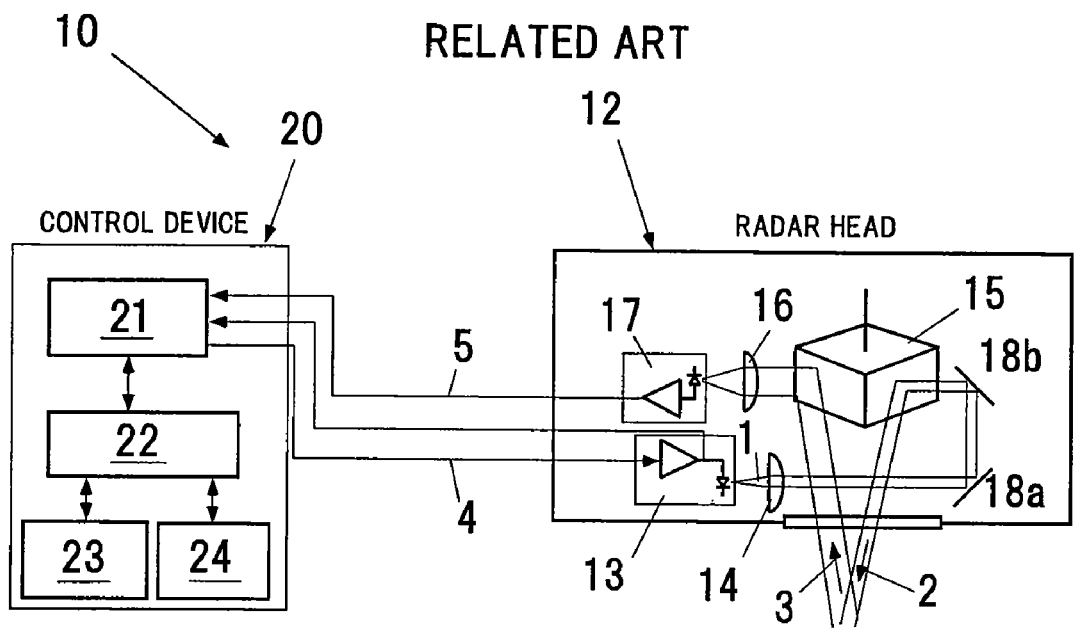
FIG. 1 is a structural drawing of a three-dimensional laser radar disclosed in "Development of a Three-Dimensional Laser Radar," by Sekimoto Kiyohide, et al., Ishikawajima-Harima Engineering Review, vol. 43, No. 4 (2003-7).

FIG. 1 is a structural diagram of a three-dimensional laser radar as one example of a range sensor. A three-dimensional laser radar is disclosed in, for example, non-patent document 3.

As is illustrated in the drawing, the three-dimensional laser radar 10 is structured from a radar head 12 and a control device 20. A pulse laser beam 1 generated from a laser diode 13 is shaped into a collimated beam 2 by a projection lens 14, is scanned in two-dimensional directions by mirrors 18a and 18b and polygon mirror 15, which rotates and swings, to illuminate the object to be measured. The pulse laser beam 3 that is reflected from the object to be measured is focused by photo receiver lens 16 via the polygon mirror 15, to be converted into an electrical signal by a photodetector 17.

A time interval counter 21 of a control device 20 measures the time interval of a start pulse 4, which is synchronized with the pulse emission timing of the laser diode 13, and a stop pulse 5, which is outputted from the photodetector 17. A signal processing board 22 outputs time interval t, and the rotation angle θ and the swing angle φ of the polygon mirror as the polar coordinate data (r, θ, φ), at the timing at which the reflected beam is detected.

r is the range (distance) with the measuring position (the installed position of the radar head) being treated as the origin, calculated by the formula r=c×t/2. Here, c is the speed of light.

The determination processing unit 23 converts the polar coordinate data from the signal processing board into three-dimensional spatial data (x, y, z), with the installed position of the radar head being the origin, and performs a detection process. Note that in this figure, 24 is a drive unit.

The scope of measurement of the three-dimensional laser radar 10, described above, is, for example, a horizontal field angle of 60°, a vertical field angle of 30°, and a maximum measurement range of 50 m. Additionally, the position detecting accuracy is, for example, about 20 cm.

Additionally, when the measured data is displayed as a range image having range values in the depth direction for each of the picture elements, if the number of measurement points in one frame is 166 points in the lateral direction and 50 points in the scan direction, then in one frame 166×50=8300 points are displayed. In this case, the frame rate is, for example, about two frames per second.

The measured points on the three-dimensional shape that is measured by the three-dimensional laser radar 10 form a set of points that are mutually dispersed by Δθ×r in the lateral direction, and by Δφ×r in the vertical direction. For example, in the case of Δθ=60/166×π/180=6.3×10$^{-3}$ rad, Δφ=30/50×π/180=10.5×10$^{-3}$ rad, and r=50 m, the interval between measured points will be approximately 315 mm in the horizontal direction and approximately 525 mm in the vertical direction even for the measured points that are most proximal.

In the present invention, a three-dimensional laser radar 10, as described above, for example, is used as the range sensor. However, the range sensor is not limited thereto, but rather may use a range sensor that utilizes parallax, or another known range sensor.

Figure 2A:
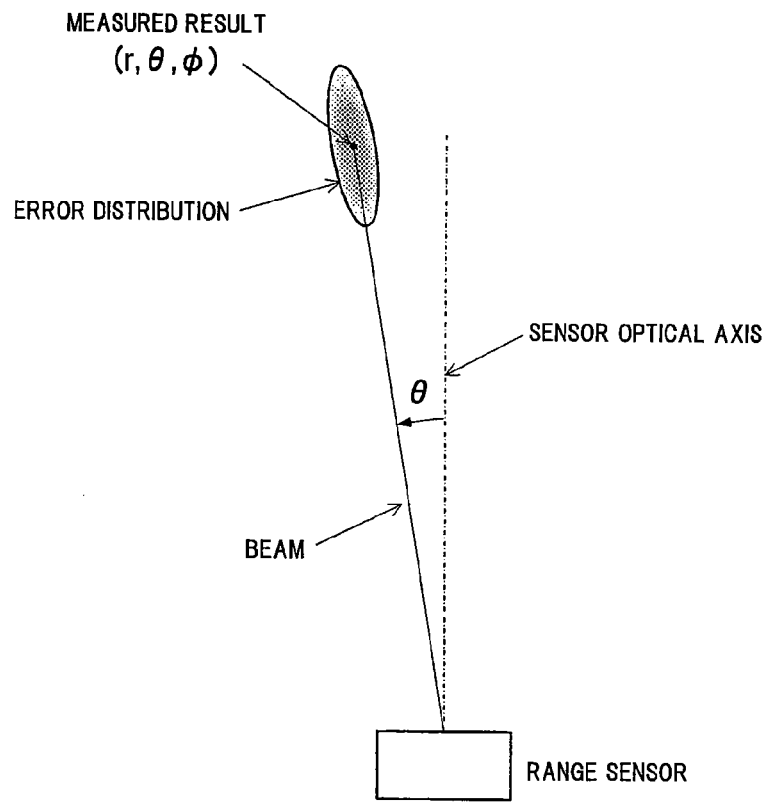
FIG. 2A is a diagram illustrating the relationship between error and polar coordinate data measured using a range sensor.
Figure 2B:
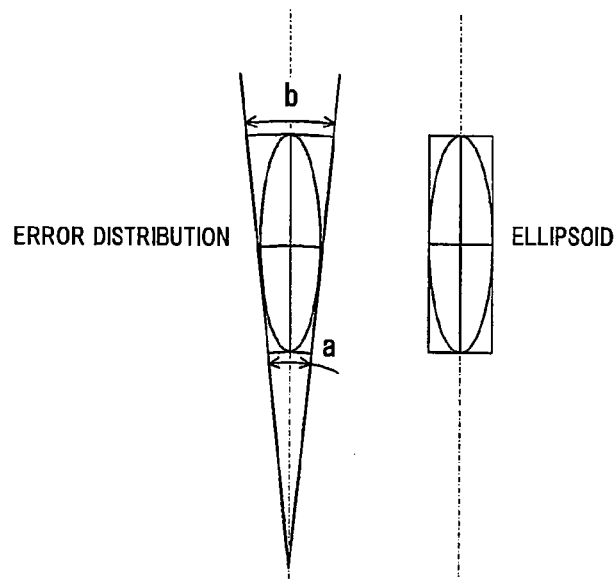
FIG. 2B illustrates a case of approximating the error distribution as an ellipsoid contained in a rectangular solid.

FIG. 2A and FIG. 2B are diagrams illustrating the relationship between error and the polar coordinate data measured using a range sensor.

As is shown in FIG. 2A, the polar coordinate values (r, θ, φ), with an arbitrary measuring position being the origin, are measured as the measurement results. Normally there is an error distribution, such as shown in the figure, in the measurement results from the range sensor.

When this error distribution is the existence probability P $(r_s, \theta_s, \phi_s)$ at the $r_s, \theta_s, \phi_s$ of the error distribution, then the error distribution will have normal distributions in axial r direction, θ direction and φ directions of the measurements, and can be represented as, for example, Equation 1. Here the r, θ, and φ are measured values by the sensor, $\sigma_r$, $\sigma_\theta$ and $\sigma_\varphi$, are standard deviations, where A is a normalization constant.

As is shown in FIG. 2B, the error distribution is normally contained within an apex-cut cone that is long in the r direction (left-hand figure), and the difference between a and b in the distant location is small. Consequently, the error distribution can be approximated, on the safe side, as an ellipsoid contained in a rectangular solid.

(Equation 1)

$$P(r_s, \theta_s, \phi_s) = \frac{1}{A} \exp\left(-\frac{(r_s - r)^2}{2\sigma_r^2}\right) \exp\left(-\frac{(\theta_s - \theta)^2}{2\sigma_\theta^2}\right) \exp\left(-\frac{(\phi_s - \phi)^2}{2\sigma_\varphi^2}\right) \quad (1)$$

Figure 3:
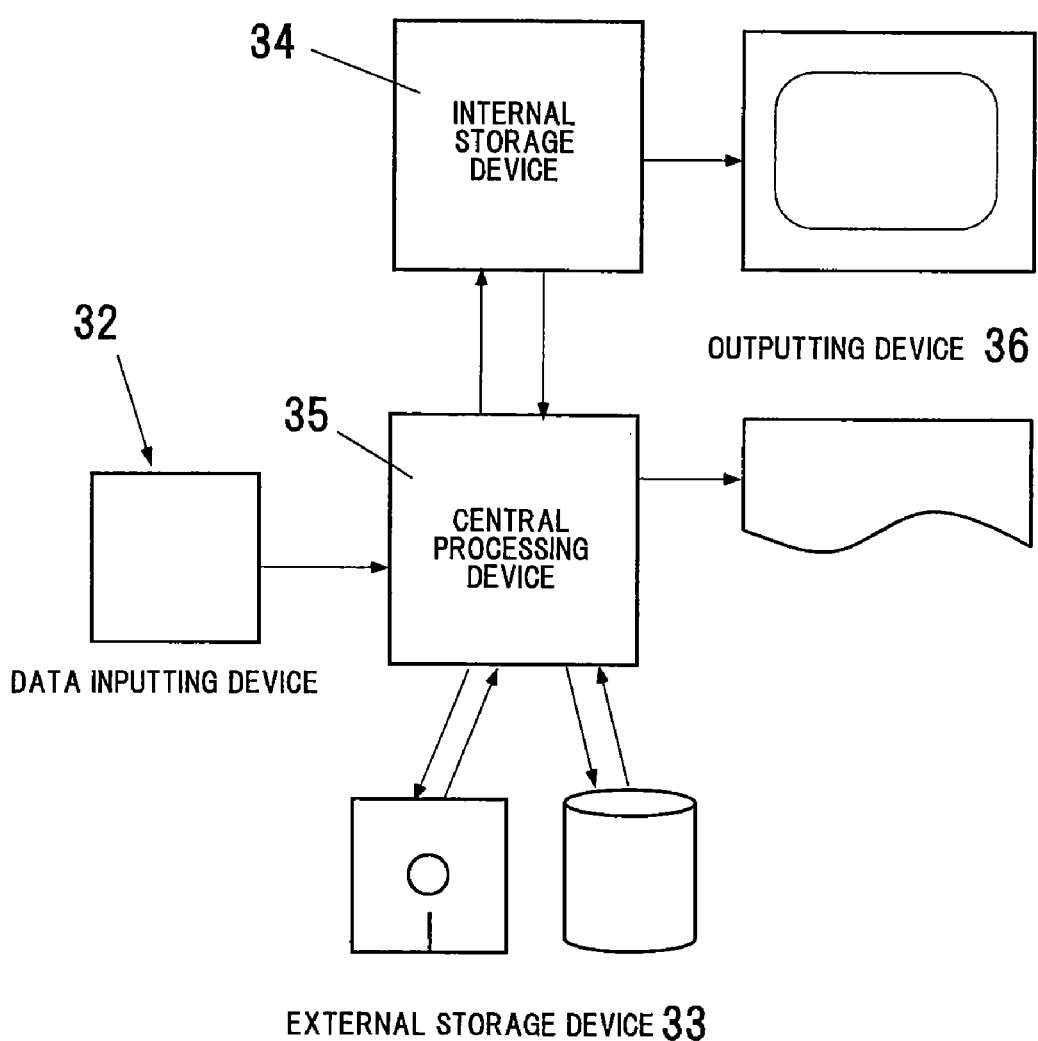
FIG. 3 is a device structural diagram for embodying a method as set forth in the present invention.

FIG. 3 is a device structural diagram for embodying a method as set forth in the present invention. As is shown in this figure, the device is provided with a data inputting device 32, an external storage device 33, an internal storage device 34, a central processing device 35, and an outputting device 36.

The data inputting device 32 has the range sensor described above, and inputs, into the storage devices, the coordinate values on the three-dimensional shape. Additionally, the position/posture, and movement range of the range sensor may be inputted through the use of, for example, a goniometer and an odometer. Note that the data inputting device 32 may also have a normal inputting means, such as a keyboard.

The external storage device 33 is, for example, a hard disk, a Floppy® disk, magnetic tape, a compact disc, or the like. If the size of the environment model becomes large and the coordinate values on the three-dimensional shape, the voxel positions, and the representative points and error distributions thereof cannot be held entirely in the internal storage device 34, as described below, then the external storage device 33 stores a portion or the entirety of the inputted three-dimensional shape coordinate values, voxel positions, and representative points and the error distributions thereof for a partial or entire environment model, and stores a program for executing the method of the present invention.

The internal storage device 34 is, for example, a RAM, a ROM, or the like, and stores a portion or the entirety of the inputted three-dimensional shape coordinate values, voxel positions, and representative points and the error distributions thereof for a partial or entire environment model.

The central processing device (CPU) 35 functions as a model structuring device, a matching device, a model updating device, and a data transferring device, and processes centrally calculations, input-output, and the like, and executes programs together with the internal storage device 34. The model structuring device is a device for performing the model structuring step, described below; the matching device is a device for performing the matching step; the model updating device is a device for performing the model updating step, described below; and the data transferring device is a device for outputting data to an outputting device 36.

The outputting device 36 is, for example, a display device, a printer, an external device, or the like, and is able to output at least the program executing results and the data that is stored in the internal storage device 34 and external storage device 33. The interface with the external storage device is a LAN, a USB, and IEEE 1394, or the like, and outputs, in response to a request, the results of the entirety of the environment model or a portion of the environment model, the results of applying the representative points, error distributions, voxel positions, and the like, within the applicable voxels, for the inputted coordinate values on the three-dimensional shape, and the like.

The device of the present invention, described above, may be a combination of the range sensor, described above, with a normal PC (computer), or may be a device wherein the entirety is a single unit. Moreover, The device of the present invention may be incorporated into a device that can move independently.

Figure 4:
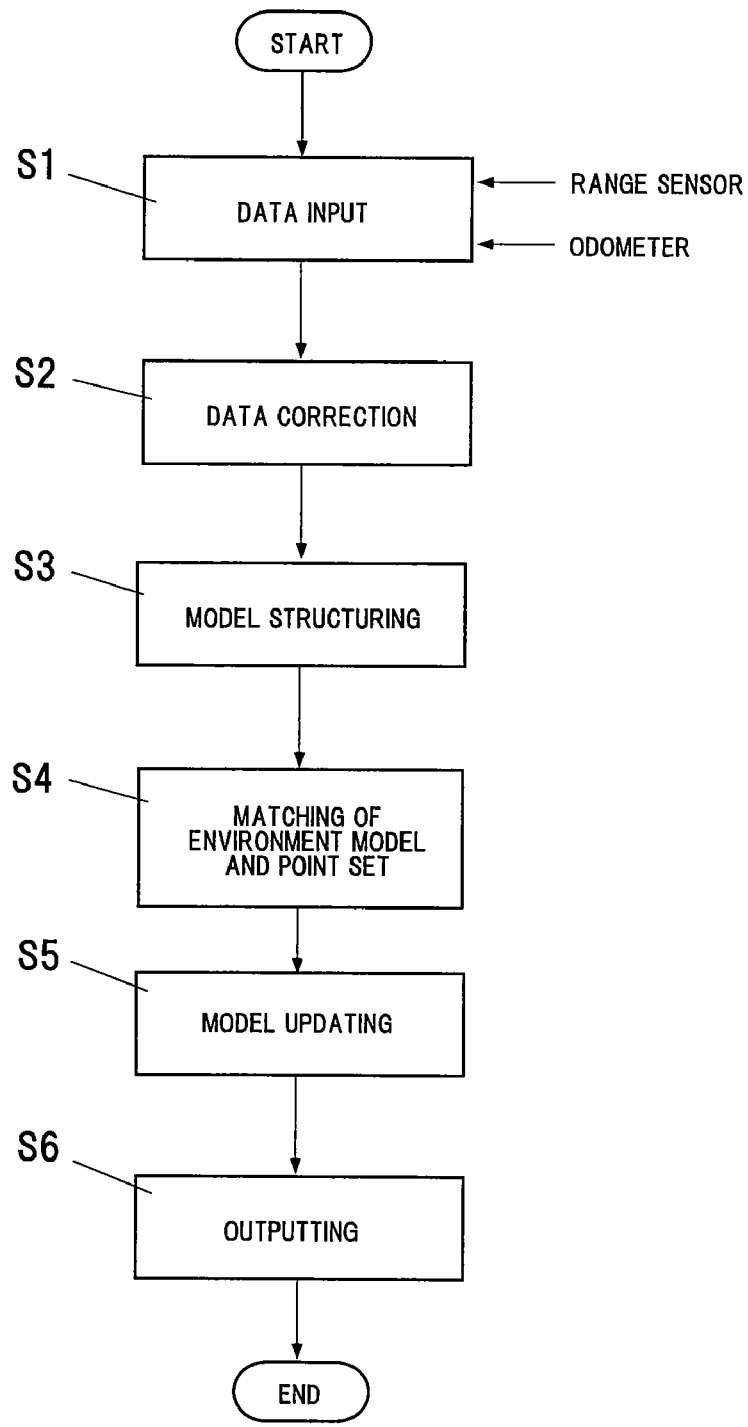
FIG. 4 is a flow chart illustrating a method as set forth in the present invention.

FIG. 4 is a flow chart illustrating a method as set forth in the present invention.

The method of the present invention is a three-dimensional shape measuring method for reproducing a three-dimensional shape from coordinate values of measured points on a three-dimensional shape, and has a data inputting step S1, a data correcting step S2, a model structuring step S3, and a matching step S4, a model updating step S5, and an outputting step S6.

Note that of this series of processes, S1, S2, and S4 through S6 are executed each time measured data is obtained, and S3 is executed only when measured data is first obtained.

In the data inputting step S1, the range sensor is used to input coordinate values on the three-dimensional shape into the storage device of a computer. Additionally, the position/orientation (posture), and movement range of the range sensor may be inputted through the use of, for example, a goniometer and an odometer.

Furthermore, in this data inputting step S1, a three-dimensional laser radar 10 may be used to sequentially obtain, as range data having an arbitrary measurement position as the origin, coordinate values on the three-dimensional shape while moving the origin.

When a three-dimensional laser radar 10 is used as the range sensor, the coordinate values on the three-dimensional shape are range data with an arbitrary measurement position as the origin, and are expressed as polar coordinate values (r, θ, φ). Moreover, the error distributions of each of the coordinate values are either found through calculating from the polar coordinate values (r, θ, φ), or inputted in advance through separate inputting means (for example, a keyboard).

In the data correcting step S2, a range data correcting process is performed to improve the accuracy of the range data. Additionally, the polar coordinate data and the odometer data may be converted into three-dimensional spatial data (x, y, z) with an arbitrary fixed position as the origin.

In the correction process for the range data, acnodes are deleted, statistical processing is performed, and the like. An acnode is a point that exists in isolation from the surrounding points, and because the measured data comprises a plurality of proximal points, acnodes can be assumed to be measurement errors and eliminated. The statistical processes take into account the error distribution included in the statistical data, to correct the ranges by performing statistical processing (such as averaging, or the like) on multiple repeated measurements.

Furthermore, these may be performed when the applicable three-dimensional shape can be approximated using a linear approximation or a planar approximation.

Figure 5:
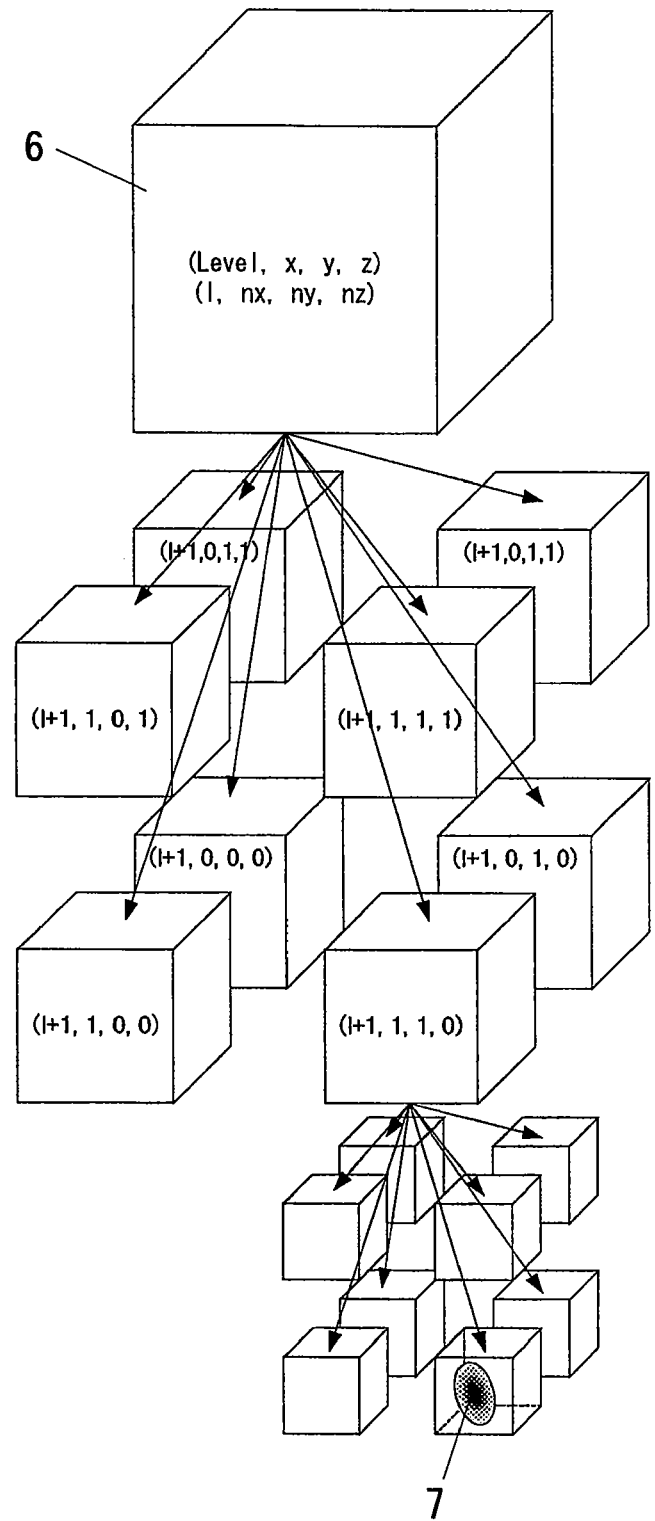
FIG. 5 is a schematic diagram of a model structuring step.

FIG. 5 is a schematic diagram of the model structuring step when oct tree is used in voxel partitioning.

In the model structuring step S3, as is shown in this figure, an environment model is structured wherein a spatial region in which a three-dimensional shape exists, is partitioned into a plurality of voxels 6 formed from rectangular solids, the boundary surfaces thereof being mutually perpendicular, and the positions of the individual voxels are stored.

The shape of the voxel 6 may be a cube wherein the length of each of the sides (edges) is identical, or may be a rectangular solid wherein the lengths of the sides are different.

Furthermore, the lengths of each of the sides of the voxel 6 may be set to a magnitude corresponding to the minimum required resolution of the largest voxel 6. In the below, the largest voxel 6 is termed the "level 1 voxel."

In addition, when a plurality of measured points exist within a single voxel, the voxel is partitioned hierarchically into a plurality of voxels using oct tree partitioning so that there will be only a single measurement point within a single voxel. In the below, a spatial region on which oct tree partitioning of the maximum voxel 6 has been performed once is termed a "level 2 voxel," and a spatial region on which oct tree partitioning has been performed k times is termed a "level k+1 voxel."

Figure 6:
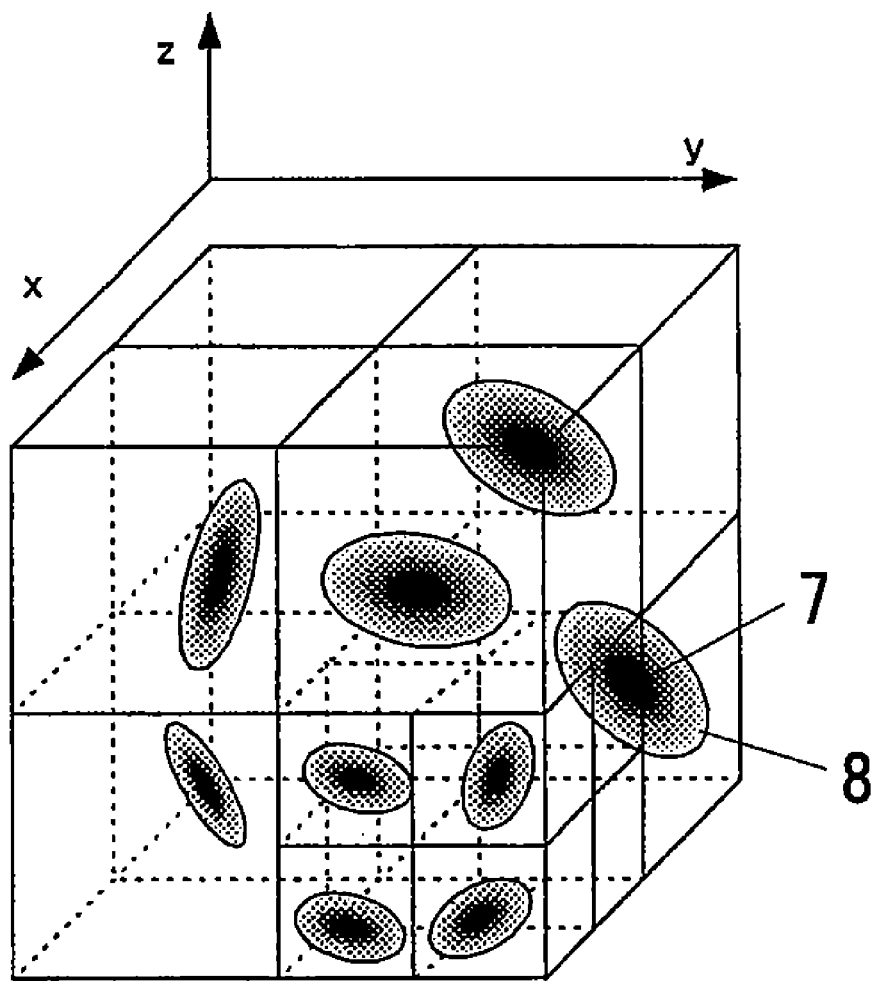
FIG. 6 is a schematic diagram of an environment model thus structured.

FIG. 6 is a schematic diagram of the environment model constructed.

In the matching step S4, as is shown in the figure, a representative point 7, and the error distribution 8 thereof, are set into the voxel 6 corresponding to a coordinate value on a three-dimensional shape, and are stored. The final voxel can have only a single representative point for a measured value. Each voxel has a representative point for a measured value, and an error distribution thereof, to represent the shape of the object.

In the matching step S4, the absolute position of the representative point is given by Equation (2). Here (x, y, z) are the relative coordinates of the representative point in the voxel; Sx, Sy, and Sz are the sizes of the sides of the voxel at level 1; $n_x(k)$, $n_y(k)$, and $n_z(k)$ are the voxel addresses at level k; and L is the level on which exists the representative point to be calculated.

(Equation 2)

$$(x, y, z) + \sum_{k=1}^{L} \left( \frac{S_x}{2^{k-1}} n_x(k), \frac{S_y}{2^{k-1}} n_y(k), \frac{S_z}{2^{k-1}} n_z(k) \right) \quad (2)$$

Figure 7A:
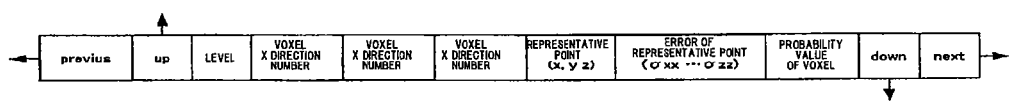
FIG. 7A is a diagram illustrating the data structure of voxel data in the present invention, illustrating a memory layout example for individual voxel data.
Figure 7B:
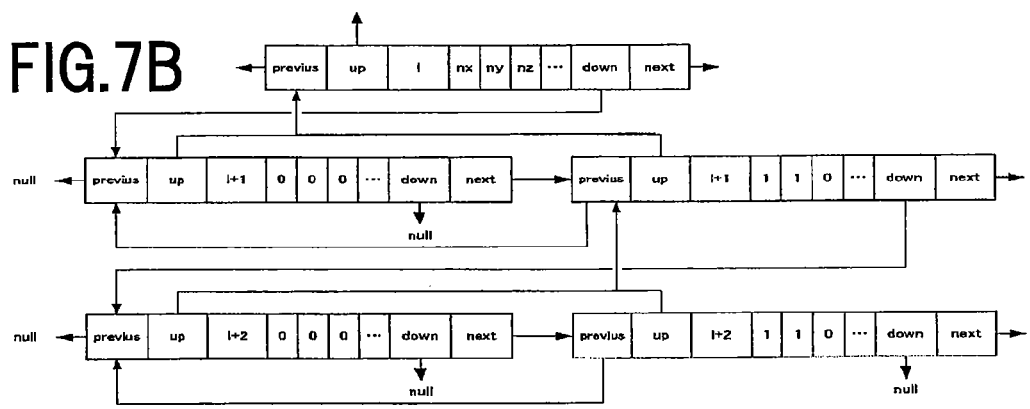
FIG. 7B is a diagram illustrating the data structure of voxel data in the present invention, illustrating an example wherein a level 2 (1, 1, 0) voxel has a representative point.

FIG. 7A and FIG. 7B are figures illustrating data structures for voxel data in the present invention.

In this figure, FIG. 7A is an example of memory layout for individual voxel data. In this figure, the arrow marks indicate links to data and values contain pointers to data.

FIG. 7B illustrates an example of a case wherein a level 2 (1, 1, 0) voxel has a representative point. Note that in this figure, null indicates an empty set.

An environment model, having the data structure described above, has the following characteristics:

(1) Content: A space is partitioned by small rectangular solids, so that each voxel has a representative point and an error distribution for a measurement point.

(2) Accuracy: The representative values correspond to the measurement points for each voxel.

(3) Existence: It is possible to express whether or not an object exists.

(4) Data size: Memory is required proportional to the number of voxels, but the size is constant.

(5) Conversion from a point set: Suitable, with little calculation amount.

(6) Access speed: Access to elements is fast because of the simple structure.

Furthermore, given these characteristics, the environment model described above fulfills all of the following effects A through C:

Effect A: Enables expression taking error into account.

Effect B: The required memory size and calculation amount is less than a specific amount.

Effect C: Expresses not only that an object exists, but that an object does not exist.

Furthermore, in FIG. 4, the model updating step S5 is performed after the matching step S4, to update the environment model structured in the model structuring step S3.

Figure 8:
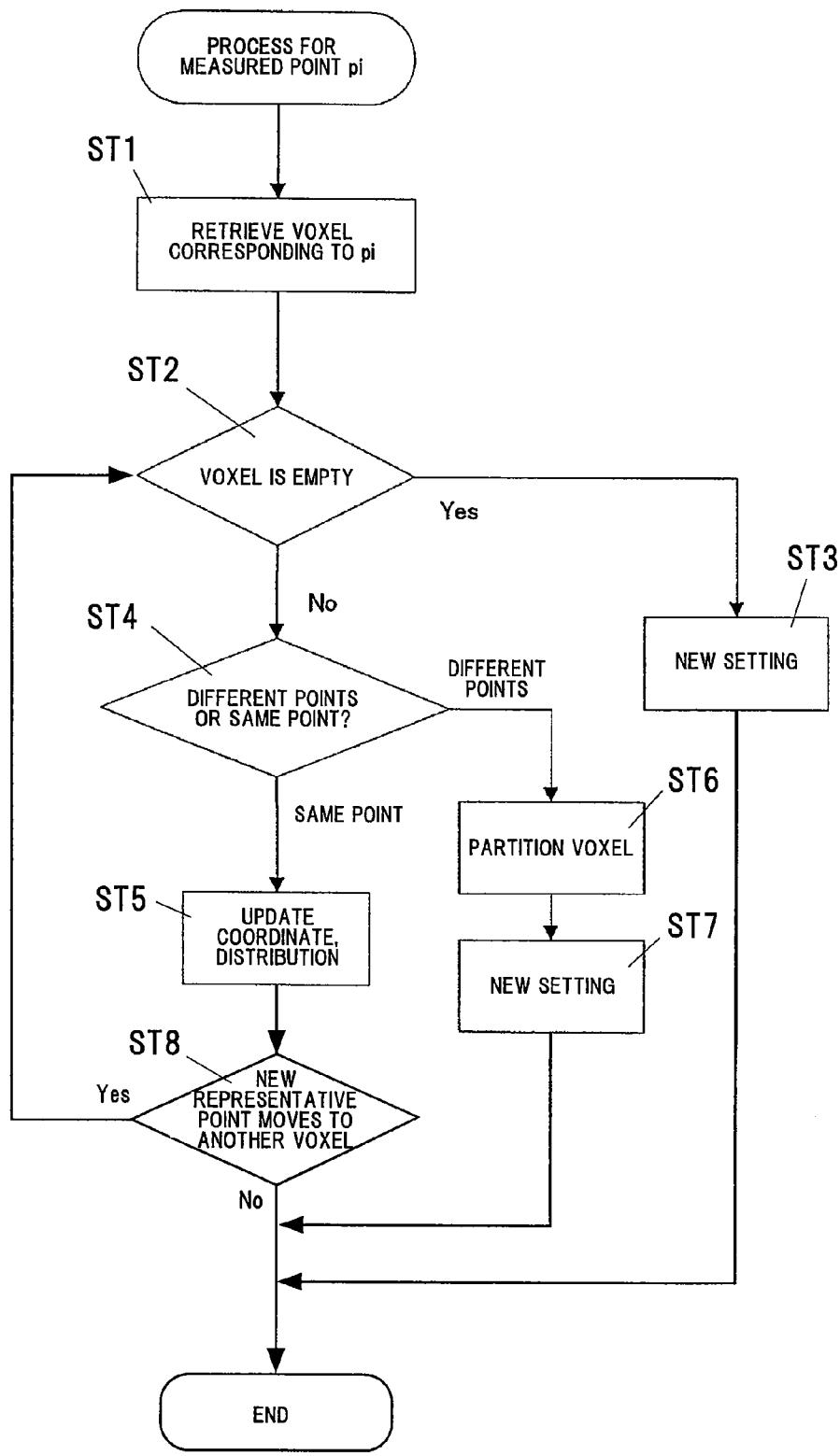
FIG. 8 is a data processing flowchart of the model updating step.

FIG. 8 is a data processing flowchart of the model updating step S5. As is shown in this figure, in step ST1, a voxel corresponding to a coordinate value of a newly inputted measurement point is retrieved, and if, in step ST2, there is no representative point within the applicable voxel (that is, the voxel is empty), then, in step ST3, the coordinate value and the error distribution of the newly inputted measurement point are set as the coordinate value and error distribution of the representative point (new registration).

Additionally, in step ST3, in principle, no object should exist between the new measuring position (the origin) and the measured point (the point to be measured). Consequently, the representative point and error distribution within the voxel that is positioned between the new measuring position (origin) and the measured point is reset or eliminated.

Figure 9:
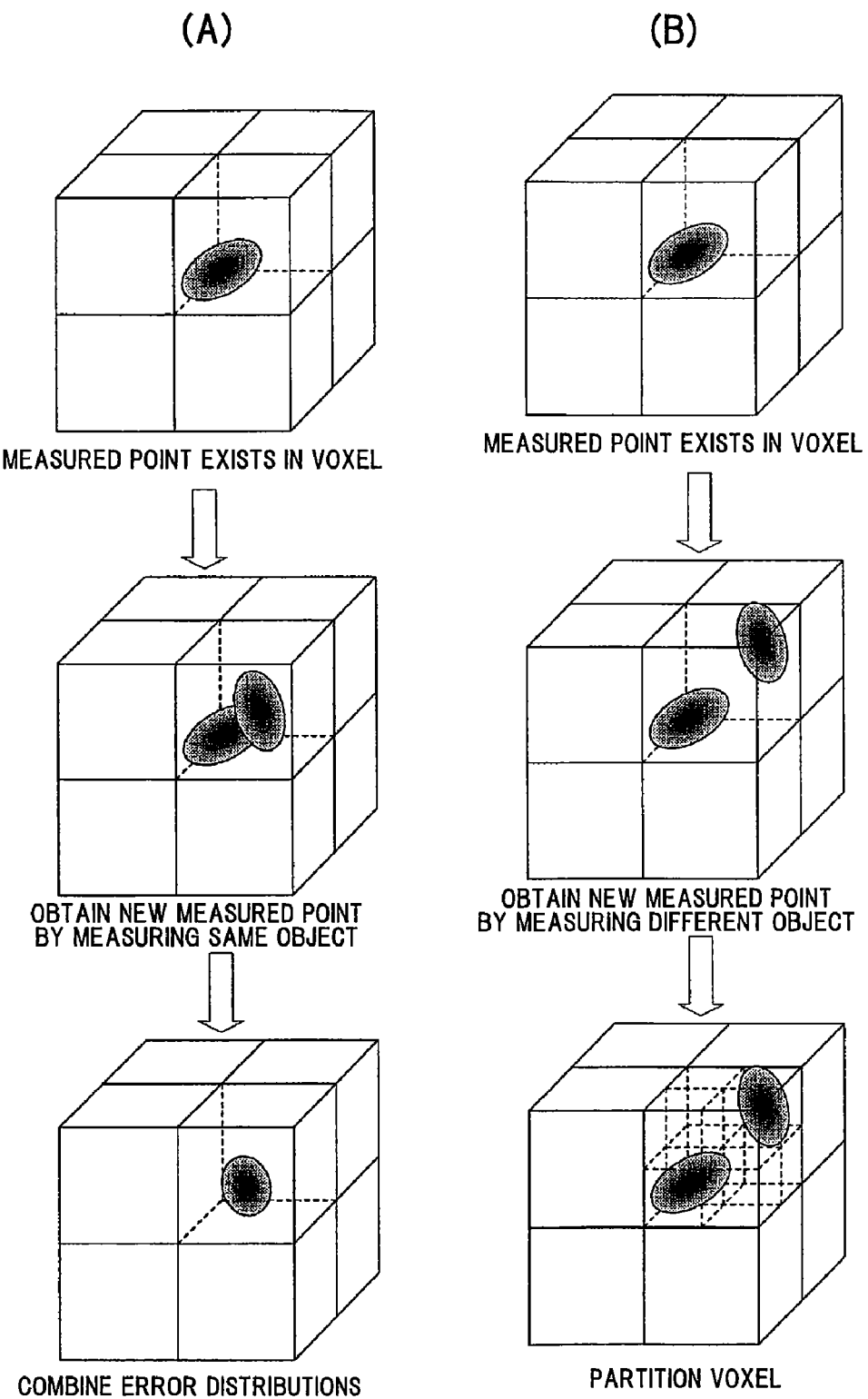
FIG. 9 is a schematic diagram of the case wherein a representative point has already been set in the applicable voxel.

FIG. 9 is a schematic diagram of the case wherein a representative point has already been set in the applicable voxel.

In step ST2 of FIG. 8, if there is a representative point already set within the applicable voxel, then, in step ST4, the newly obtained error distribution and the error distribution already set within the voxel are compared (in other words, a determination is made as to whether they are different points or identical points).

If, in this comparison, the error distributions mutually overlap (FIG. 9A), then, in step ST5, a new error distribution and the center of the new error distribution are reset from both of the error distributions, or from both error distributions, the representative point that is already set within the voxel, and the coordinate value of the newly inputted measurement point (that is, the error distributions are combined).

Moreover, if, in this comparison, the error distributions do not mutually overlap (FIG. 9B), then, in Steps ST6 and ST7, the applicable voxel is further oct tree partitioned hierarchically into a plurality of voxels, which are then newly registered, so that there will be only a single representative point in a single voxel.

The reference for partitioning and combining is determined based on, for example, the degree of coincidence of the error distributions. In the degree of coincidence of the error distribution, a distance scale such as Mahalanobis' generalized distance or likelihood, for example, may be used. In addition, it may be determined through statistical testing, based on the two error distributions, whether or not the two express the identical point.

In step ST5, if the result of setting a new error distribution and a new error distribution center from both error distributions is that the new representative point has moved into a new voxel (that is, YES in step ST8) processing returns to step ST2, and the process above is repeated.

Figure 10:
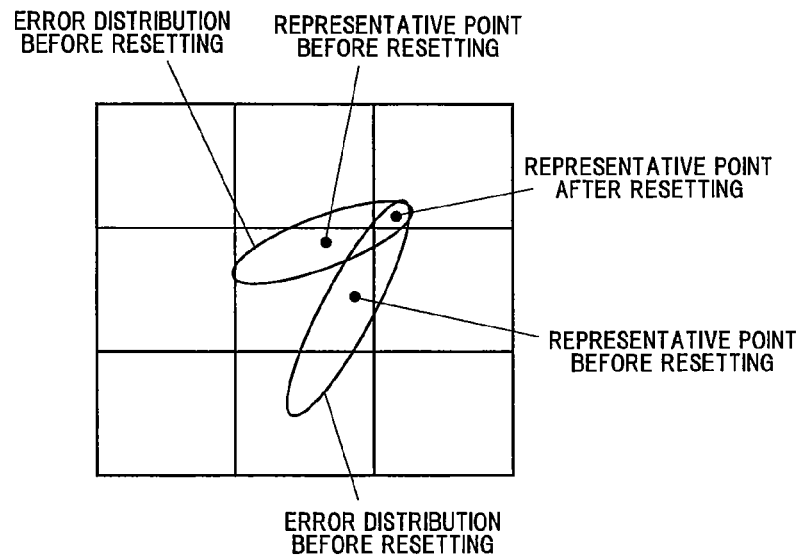
FIG. 10 illustrates the case wherein the new representative point has moved to within a different voxel, as the result of resetting a new error distribution and the center of the new error distribution from both error distributions, when the error distributions are mutually overlapping.

Note that FIG. 10 illustrates the case wherein the new representative point has moved to within another voxel, as the result of resetting a new error distribution and a new error distribution center point from both of the error distributions in step ST5, or from both of the error distributions and the representative point already set within the voxel and the coordinate values of the newly inputted measurement point.

Figure 11:
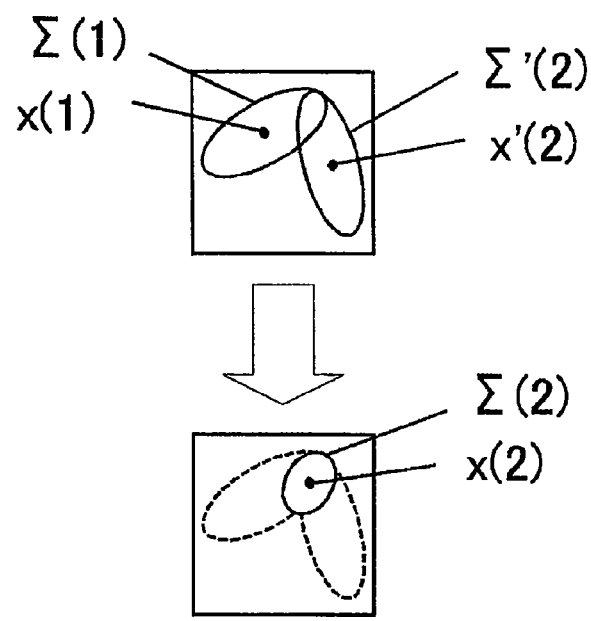
FIG. 11 is a schematic diagram of the case wherein error distributions are mutually overlapping.

FIG. 11 is another schematic diagram of the case (FIG. 9A) wherein error distributions are mutually overlapping. In step ST5 of FIG. 8, a Kalman filter can be used as means for setting the new representative point and error distribution by combining two representative points and error distributions. For example, in the two-dimensional case, as shown in this figure, if the two representative points are, respectively, x (1) and x' (2), and the two error distributions are $\Sigma$ (1) and $\Sigma'$ (2), and the combined representative point is x (2) and error distribution is $\Sigma(2)$, a schematic diagram of a calculation of the representative point x (2) and of the error distribution $\Sigma(2)$ is as in FIG. 11.

In FIG. 4, in the outputting step S6, the voxel position, the representative point, and the error distribution are outputted to the outputting device 36. For the case wherein the outputting device 36 is a display device (for example, a CRT), preferably there is a three-dimensional display on a three-dimensional image.

Additionally, in the outputting step S6, the voxel position, and the representative point and the error distribution thereof may be transferred to another device (such as a control device or a computer), and may be outputted to a printer. That is, the outputting device 36 may be the another device (for example, a control device or a computer).

Note that the outputting device 36 may be an appropriate storage device capable of storing and maintaining the voxel position, the representative point, and the error distribution thereof.

Additionally, in the outputting step S6, not only is the position of the representative point of the voxel outputted to the outputting device 36 as the three-dimensional shape measurement value, but also an index (such as a numeric value) indicating the reliability or accuracy of the measurement value is outputted to the outputting device 36 based on the magnitude of the error distribution within the voxel. Moreover, in the outputting step S6, when the position of the representative point of the voxel is outputted to the outputting device 36 as the three-dimensional shape measurement value, if the magnitude (width) of the error distribution within the voxel is larger than a specific reference value, then the reliability or accuracy of the measurement value is regarded to be less than a specific reference, and the measurement value for the voxel (that is, the position of the representative point for the voxel) is not outputted to the outputting device 36.

Moreover, in the model updating step S5, a voxel corresponding to the coordinate value of the newly inputted measured point is retrieved, and if at least one of the representative point and the error distribution within that voxel is newly set, or reset, or that voxel is further partitioned hierarchically into a plurality of voxels, only then, in the outputting step S6, the position of the representative point of that voxel is outputted to the outputting device as a three-dimensional shape measurement value.

Additionally, in the outputting step S6, the position of a representative point for a voxel in the environment model in a scope for which the position can be seen when the position and orientation of the range sensor are obtained is outputted to the outputting device as a three-dimensional shape measurement value. The scope that can be seen from the position of the range sensor is the scope over which the range sensor can measure the position, and may include an angular scope over which the range sensor can measure position from the position of the range sensor (the field of view), and may include a distance scope over which the range sensor can measure position from the position of the range sensor.

The sequence of processes illustrated in FIG. 4 is repeated each time new measured data can be obtained at a new measuring position, and the results are stored in at least one of the internal storage device 34 and external storage device 33. In order to increase the speed of processing, the results should be stored in the internal storage device insofar as capacity allows.

The method and device as set forth in the present invention, as described above, partition a spatial region in which a three-dimensional shape exists into a plurality of voxels 6 and record, in an external storage device 33, the position of each voxel, so that when the object to be measured is large, the data size is kept small in proportion to the number of voxels.

Additionally, a representative point 7 and an error distribution 8 thereof are set and recorded within a voxel 6 corresponding to a coordinate value, enabling the display of data at greater than the voxel resolution.

Additionally, in the model structuring step S3, the largest voxel 6 is set to a size corresponding to the minimum required resolution, and when a plurality of measuring points exists within a single voxel 6, the voxel is further oct tree partitioned hierarchically into a plurality of voxels so that only a single measuring point exists within a single voxel, making it possible to simultaneously suppress the data size and further increase the resolution through the use of the voxels after partitioning and representative points.

In particular, by obtaining a plurality of coordinate values on a three-dimensional shape as range data with a plurality of measuring positions as the origin and using the coordinate values of the range data as the coordinate values of the representative points and using the measurement error of the coordinate values of the range data as the error distribution of the representative points, precise coordinate values and error distributions can be used to combine a plurality of measurements statistically, enabling further increased accuracy.

Figure 12:
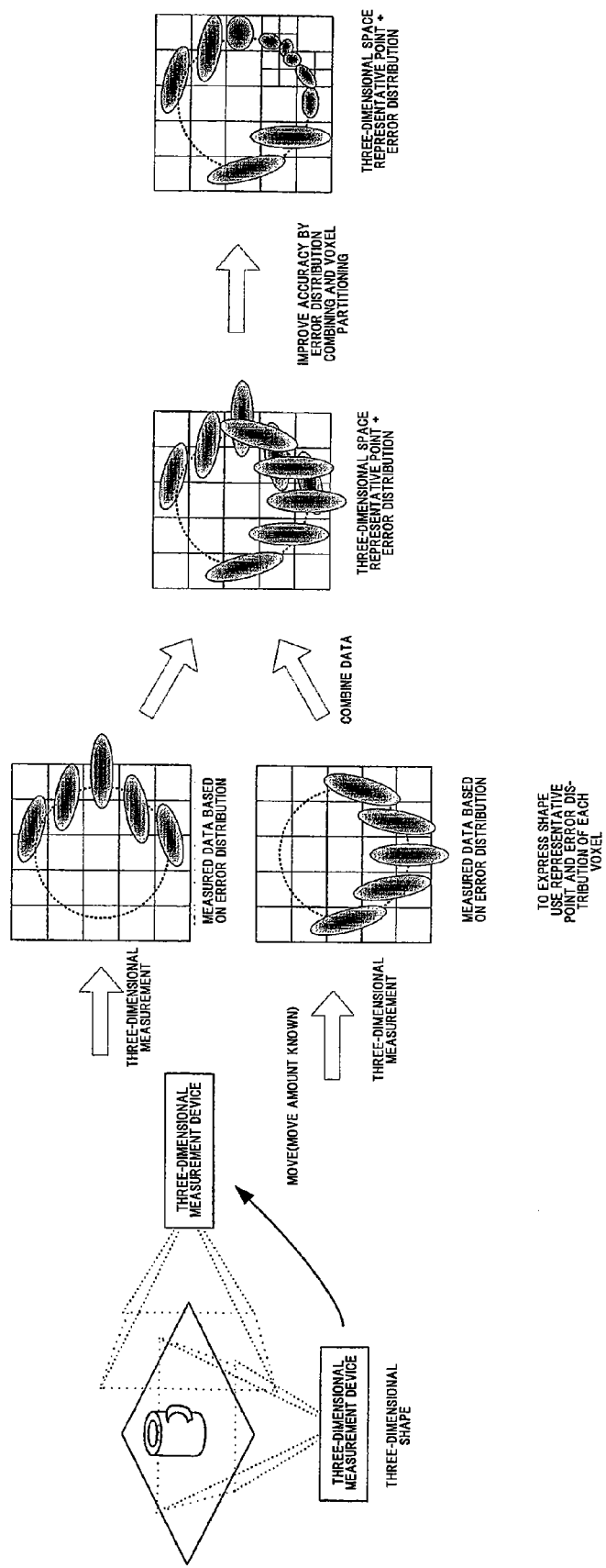
FIG. 12 is a schematic diagram illustrating the case wherein the error distribution of the representative point is reduced and the accuracy of the representative point is increased through integrating range data having a plurality of measurement positions as the origins.

FIG. 12 illustrates the case wherein the accuracy of the representative point is increased through reducing the error distribution of the representative point through integrating range data having a plurality of measuring positions as the origins. In this way, the range data that is obtained using different measuring positions (in other words, positions of the three-dimensional measurement device that is the range sensor) have different orientations in the error distribution, so these range data are sequentially integrated through the environment model to compress the error distribution of the representative point to improve the accuracy of the position of the representative point. Note that in FIG. 12, the drawing after the three-dimensional measurement is a schematic drawing and showing a two-dimensional cross section of a cup, where the dotted line in the drawing after the three-dimensional measurement shows the actual surface of the cup.

Furthermore, assuming no object exits between the origin and the measuring point, by resetting or eliminating representative points and error distributions within the voxels positioned therebetween, erroneous measured data can be corrected or eliminated.

Additionally, by retrieving the voxel that corresponds to the coordinate value of a newly inputted measured point, and setting the coordinate value and the error distribution as the coordinate value and error distribution of the representative point when there is no representative point in the voxel, the coordinate value and error distribution of the representative point can be set easily.

Furthermore, when there is a representative point that has already been set within the voxel, a newly obtained error distribution and the error distribution already set within the voxel are compared;

and if the error distributions are mutually overlapping, a new error distribution and a new representative point are set from both of the error distributions or from both of the error distributions and the representative point already set within the voxel and the coordinate values of the measurement point newly inputted; and if the error distributions are not mutually overlapping, then the voxel is further oct tree partitioned hierarchically into a plurality of voxels so that only a single representative point exists within a single voxel, thereby making it possible to cause convergence to a high accuracy shape while avoiding the accumulation of error.

Figure 13:
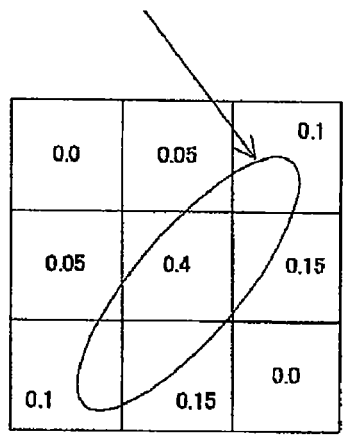
FIG. 13 is a schematic diagram of a method for calculating the voxel probability values.

The probability value for each voxel is calculated from the representative point and the error distribution. The voxel probability value may be, for example, calculated from a ratio of the error distribution that is within the voxel relative to the entirety of the error distribution, as shown in FIG. 13.

Figure 14:
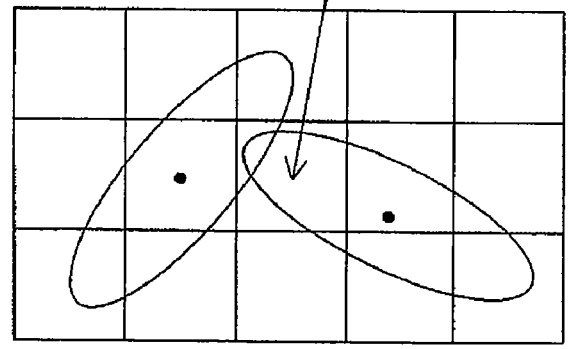
FIG. 14 is a schematic diagram of a method for calculating the voxel probability values when error distributions are mutually overlapping.

In addition, when two or more error distributions intersect, for example, as shown in the schematic diagram of FIG. 14, the probability values are combined through Bayesian inference, or the like, using the probability values for the individual error distributions.

When an error distribution of a position and an orientation of a range sensor can be obtained, this error distribution can be combined with the error distribution of the measured data to calculate the absolute error of the measured data.

For example, when the range sensor is mounted in a carriage with an odometer, typically there is error in the odometer data because of slippage in the carriage, so there will be error in the position of the range sensor. FIG. 15 is a schematic diagram of the case of calculating the absolute error of measured data through combining the error distribution of the range sensor position and the error distribution of the measured data.

Consequently, given the method and device as set forth in the present invention, not only is there a function for correcting, to correct data, range data that includes error, but also this function is repeated, causing convergence to a highly accurate shape in measurements over extended periods of time. Furthermore, the method as set forth in the present invention has a low calculation amount because it is a process that updates representative points 7, which correspond to the individual voxels 6, and the error distributions 8 thereof, by new measured points. Furthermore, the calculation is closed within a voxel, having no influence on the surrounding voxels, enabling high-speed processing. Additionally, the measured data can be integrated sequentially into voxel structures wherein the largest voxels have resolutions at the minimum requirements, so the memory size does not greatly rise above a fixed size.

Furthermore, having probability values for each voxel enables the determination of a probability value for a given voxel without recalculating, from the error distribution, whether or not an object exists in the voxel when a voxel is discovered that contains a representative point, even when the error distribution is wider than that of the voxel that contains the representative point.

Moreover, even when there is error in the sensor position and orientation, this error distribution is combined with the error distribution of the measured data to calculate an absolute error of the measured data, enabling an increase in the positional accuracy of the target object.

The model updating step using the Kalman filter will be described in detail.

In the model updating step using the Kalman filter, a new representative point and error distribution are obtained and reset through a Kalman filter from the newly inputted measured point coordinate value and the error distribution thereof, and the representative point and the error distribution thereof that have already been set in the voxel.

With each position m (i) of model point set being treated as a status quantity, the model can be expressed by the following Equation 3 based on the position of the measuring points of the range sensor. Note that in the present embodiment, m(i) is the representative point in the voxel (also in the description below).

(Equation 3)

$$L(j) = h_m(R_r, t_r, m(i)) + v_L(j) \\ = R_s^{-1}(R_r^{-1}(m(i) - t_r) - t_s) + v_L(j) \ (j = 1, \ldots, N)$$ (3)

In Equation 3:

L (j) is the measured position by the range sensor. For example, L (j) is L (j)=$(x_L(j), y_L(j), z_L(j))^t$ for measured points j (j=1, ..., N) of a three-dimensional LRF (laser range finder) in the sensor coordinate system of the range sensor. Here t indicates the transposed matrix (also in the description below).

$h_m$ ($R_r$, $t_r$, m(i)) is the observation system model regarding L (j).

$R_r$ is the rotation matrix $R_r$=($\theta_x$, $\theta_y$, $\theta_z$) that indicates the posture relative to the world coordinate system of the moving unit (for example, a moving robot) on which the range sensor is mounted. Note that $\theta_x$, $\theta_y$, $\theta_z$ indicate the degrees of rotation around the x-axis, y-axis, and the z-axis, respectively (also in the description below).

$t_r$ is the translation vector $t_r$=(x, y, z)) that indicates the position relative to the world coordinate system of the moving unit (for example, a moving robot) on which the range sensor is mounted.

$v_L(i)$ is the observation noise that is added to the measured value L (j) of the range sensor.

$R_s$ is the rotation matrix $R_s$=R ($\theta_x$, $\theta_y$, $\theta_z$) of the sensor coordinate system relative to the moving unit coordinate system.

$t_s$ is the translation vector $t_s$=(x, y, z) that expresses the position of the sensor coordinate system relative to the moving unit coordinate system.

The object being measured is stationary, where the position and posture of the object being measured are stationary relative to the environment model.

The set of measured points by the range sensor are correlated with the points i (that is, the representative points) of the environment model point set. The points i of the model point set for which this correlation is performed are updated by the following equation 4. Note that only the representative points m (i) of the model point set that is correlated with the measured point set by the range sensor may be updated by the following Equation 4.

(Equation 4)

$$K_{mk}(i) = \Sigma_{mk,k-1}(i)H_{mk}(j)^t(H_{mk}(j)\Sigma_{mk,k-1}(i)H_{mk}(j)^t + \Sigma_{Lk}(j))^{-1}$$

$$m'_k(i) = m_{k,k-1}(i) + K_{mk}(i(L_k(j) - h_{mk}(R_{rk}, t_{rk}, m_{k,k-1}(i))))$$

$$\Sigma'_{mk}(i) = \Sigma_{mk,k-1}(i) - K_{mk}(i)H_{mk}(j)\Sigma_{mk,k-1}(i)$$ (4)

In Equation 4:

The suffix k indicates the value at the discrete time k.

In regards to $m_k$ (i), $m'_k$ (i) indicates the updated value (the posteriori inference value) of $m_k$(i) where $m_{k,k-1}$(i) indicates the predicted value (the a priori inference value) of $m_k$(i) based on $m'_{k-1}$(i). Note that the environment (the object to be measured) is stationary, so $m_{k,k-1}$(i)=$m'_{k-1}$(i).

$\Sigma_{mk}$(i) is the error covariance matrix (that is, the error distribution, described above) of the representative point $m_k$ (i) within a voxel. Additionally, in regards to $\Sigma_{mk}$(i-), $\Sigma'_{mk}$(i) indicates the updated value (the posteriori inference value) of $\Sigma_{mk}$(i) where $\Sigma m_{k,k-1}$(i) indicates the predicted value (the a priori inference value) of $\Sigma_{mk}$(i) based on $\Sigma'_{mk-1}$(i). In the sensor coordinate system, the position of the three-dimensional LRF measured point j (j=1, ..., N) is expressed by L (j) where the error covariance matrix is expressed by $\Sigma_L$(j). Here the N is the total number of measured points obtained by the three-dimensional LRF. For the error model for the three-dimensional LRF, a constant normal distribution that is independent of the measurement distance is assumed. When the laser is emitted in the direction of the x-axis in the sensor coordinate system, the error covariance matrix will be $\Sigma_s$. The posture of the error distribution will vary depending on the direction in which the laser is emitted. $\Sigma_L$(j) indicates the $\Sigma_L$(j)=$R_L$(j) $\Sigma_s R_L^t$(j) using the rotation matrix $R_L$(j) for the direction in which the laser is emitted relative to the standard direction. The position z (j), and the error covariance matrix $\Sigma_z$(j) in the world coordinate system of the measured point j can be expressed, respectively, by $$z(j)=R_r(R_s L(j)+t_s)+t_r.$$

and $$\Sigma_z(j)=R_r R_s \Sigma_L(j) R_s^t R_r^t.$$

$K_{mk}$(i) is the Kalman gain for $m_k$(i).

$h_{mk}$ ($R_{rk}$, $t_{rk}$, $m_{k,k-1}$(i)) is the observation system model regarding $L_k$(j), i=$p_k$(j). i=$p_k$(j) is a point on the environment map (or in other words, the environment model) corresponding to the measured point j.

$H_{mk}$ is the Jacobian matrix for the observation system model for $L_k$(i) and i=$p_k$(j), and is expressed by the following Equation 5.

(Equation 5)

$$H_{mk}(j) \frac{\partial h_{mk}(R_k, t_k, m_k(i))}{\partial m_k(i)} \bigg|_{m_k(i)=m_{k,k-1}(i)}$$ (5)

The updating process using the Kalman filter updates the environment model, using the following procedures, at the stage wherein the updated value $m'_k$(i) of each point (the representative points for the voxels) of the model point set and the updated value $\Sigma'_{mk}$(i) of error covariance matrix for the environment map are obtained:

(1) These updated values $m'_k$(i), $\Sigma'_{mk}$(i) are reset as a new representative point and error distribution.

(2) If the result of (1) is that the position of the representative point has moved into another voxel, and if the voxel to which the representative point has moved does not already have a representative point, then the representative point and error covariance matrix after the move will be held in the destination voxel, and the representative point and so on, will be deleted from the origin voxel. If the voxel that is the move destination already has a representative point, then a determination is made as to whether or not the error distributions of the two representative points overlap each other (the same as the decision in ST 4, above). The process thereafter is the same as the processes in and after ST4, in FIG. 8.

(3) When it comes to a point to be measured by the range sensor for which no correlation has been defined with a representative point m(i) of a model point set, if the voxel including this measured point does not have the representative value, that representative point and error distribution are added and maintained as the representative point and error distribution for that voxel. If a representative point already exists within the voxel, the voxel is partitioned such that the existing representative points and each of the measured points, including another plurality of points for which no correlation (or correspondence) has been made, will all be included in different voxels, so that the voxels inherit the representative points and the like.

Repeating the model updating step using the Kalman filter, as described above, not only gradually reduces the scope of the error covariance matrix (that is, the error distribution), but also makes voxels easier to partition. Partitioning the voxels enables expression of changes that are smaller in size than the initial voxels.

Figure 16:
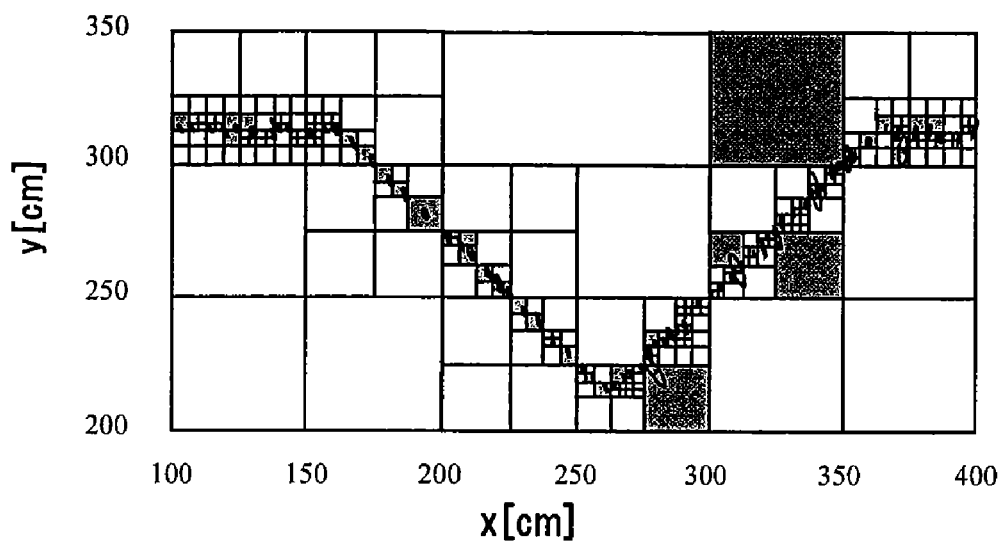
FIG. 16 illustrates the result obtained through the model updating step using the Kalman filter.
Figure 17:
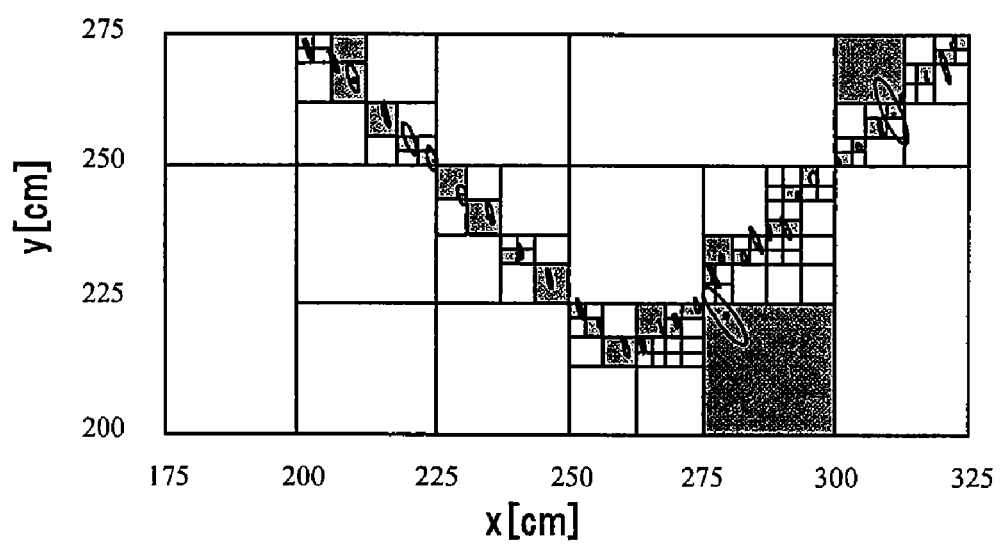
FIG. 17 is a partial expanded view of FIG. 16.

FIG. 16 illustrates the result obtained through the model updating step using the Kalman filter. FIG. 17 is a partial expanded view of FIG. 16. In these figures, if the length of one side of an initial voxel is 100 cm, partitioning may be performed up to 6 times. In the area in which the object exists, as the results of repetitive repartitioning of voxels, the object is displayed with excellent accuracy. In regions wherein there is no object, the repartitioning of voxels is not performed, enabling the expression of the environment with the required and adequate data size. Moreover, error distributions of the representative points within the various voxels are small, and the environment map can be expressed with high accuracy. In this way, even if the data contains error, the results converge nicely due to the effect of the Kalman filter. Moreover, in this method the number of measured points can be increased to reduce the standard deviation, which can be expected to further increase the accuracy.

In addition, because the position and posture of the object to be measured are stationary, the updating can be performed independently of the position and posture of the object to be measured. Note that updating using the Kalman filter on only the representative points m (i) of the model point set for which correlations (or correspondence) have been established with the measured point sets obtained by the range sensor can greatly reduce the calculating amount.

An additional explanation will be given regarding establishing associations (correlation) between the measurement points and the environment map (that is, the environment model). The association is established as follows.

The highest level of voxels that intercept the scope of the error covariance matrix $\Sigma_L(j)$ for the measurement point j of interest (a scope of, for example, 3× the standard deviation), and the highest level of voxels adjacent to those voxels, are calculated, and the representative points that exist within these voxels, including the voxels on lower levels, are defined as candidates for corresponding points. Because the voxels form a hierarchical structure, the retrieval of the candidate points is essentially without calculation amount. At this time, if there are no candidate representative points, then there are no corresponding points. The reason for adding the adjacent voxels to the candidates is because there are cases wherein, depending on the position of the representative point within the voxel, the scope of the error covariance matrix extends into the adjacent voxel.

As forms of embodiment, explanations were given regarding a three-dimensional shape data recording/displaying method and device, and regarding a three-dimensional shape measuring method and device; however, when a two-dimensional shape is viewed as a special case of a three-dimensional shape, the present invention can be embodied as a two-dimensional shape data recording/displaying method and device and a two-dimensional shape measuring method and device.

Additionally, in the outputting step described above, the position of the voxel, the representative point, and the error distribution need not all be outputted, but rather, for example, in a case wherein it is possible to understand the three-dimensional shape without all these, or when only one or two of these are necessary, then at least one of the voxel position, the representative point, and the error distribution may be outputted to the outputting device.

Note that the present invention is not limited to the embodiments described above, but rather, of course, various modifications can be made without deviating from the intent of the present invention.

The invention claimed is:

1. A three-dimensional shape data recording/displaying method for reproducing a three-dimensional shape from coordinate values of measured points on a three-dimensional shape, the method comprising the steps of:
   (a) inputting, into a computer, coordinate values on a three-dimensional shape in a data inputting step;
   (b) structuring, in a model structuring step, an environment model that partitions a spatial region, in which the three-dimensional shape exists into a plurality of voxels formed from rectangular solids, of which boundary surfaces are mutually perpendicular, and storing positions of individual voxels;
   (c) setting and recording, in a matching step, a representative point and an error distribution within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction, wherein the matching step further includes setting and recording a plurality of representative points in the plurality of voxels, respectively, and a plurality of error distributions of the plurality of representative points are set and recorded in the plurality of voxels, respectively, wherein the plurality of representative points include the representative point, and the plurality of voxels include the first voxel, and the plurality of error distributions include the error distribution; and
   (d) outputting, to an outputting device, a voxel position, the representative point, and the error distribution in an outputting step.

2. The three-dimensional shape data recording/displaying method as set forth in claim 1, further comprising, in the model structuring step, the steps of
   setting a second voxel to a size corresponding to a minimum required resolution; and
   when a plurality of measured points exist within a single voxel, further partitioning hierarchically the second voxel into a plurality of third voxels so that only a single measured point exists within a single voxel.

3. The three-dimensional shape data recording/displaying method as set forth in claim 1, further comprising the steps of:

(e) updating, in a model updating step, the environment model after the matching step; wherein the model updating step further comprises the steps of
  i. retrieving a second voxel corresponding to a second coordinate value of a newly inputted measured point; and
  ii. deciding that no object exists between an origin and a measuring point, and resetting or eliminating representative points and error distributions within those voxels positioned therebetween.

4. The three-dimensional shape data recording/displaying method as set forth in claim 1, further comprising the step of:
(e) updating, in a model updating step, the environment model after the matching step, wherein the model updating step further comprises the steps of
  i. retrieving a second voxel corresponding to a second coordinate value of a newly inputted measured point; and
  ii. when there is no representative point within the second voxel, setting the second coordinate value and the error distribution as a third coordinate value and error distribution of the representative point.

5. The three-dimensional shape data recording/displaying method as set forth in claim 1, further comprising the step of:
(e) updating, in a model updating step, the environment model after the matching step, wherein the model updating step further comprises the steps of
  i. retrieving a second voxel corresponding to a second coordinate value of a newly inputted measured point;
  ii. when there is a representative point that has already been set within the second voxel, comparing a newly obtained error distribution and an error distribution already set within the second voxel;
  when the error distributions are mutually overlapping, resetting a new error distribution and a new representative point from both error distributions; and
  when error distributions are not mutually overlapping, further partitioning hierarchically the second voxel into a plurality of third voxels so that only a single representative point exists within a single voxel.

6. The three-dimensional shape data recording/displaying method as set forth in claim 5, further comprising the steps of:
  comparing, in the model updating step, the newly obtained error distribution and the error distribution that has already been set within the second voxel;
when the error distributions are mutually overlapping, and a new representative point has moved into another voxel as the result of resetting a new error distribution and a new representative point from both of the error distributions, in the case where there is no representative point in the another voxel, setting the new error distribution and the new representative point into the another voxel;
  when there is a representative point that has already been set in the another voxel, then comparing the new error distribution and the error distribution that has already been set into the another voxel;
  when the error distributions are mutually overlapping, then resetting a new error distribution and a new representative point from either both error distributions or from both error distributions and the representative point that has already been set within the second voxel and a newly entered measured point coordinate value; and
  when the error distributions are not mutually overlapping, further partitioning a voxel hierarchically into a plurality of fourth voxels so that only a single representative point exists within a single voxel.

7. The three-dimensional shape data recording/displaying method as set forth in claim 1, wherein the first voxel holds a probability value in addition to the representative point and error distribution.

8. The three-dimensional shape data recording/displaying method as set forth in claim 1, further comprising, in the data inputting step, the steps of
  i. sequentially obtaining coordinate values on the three-dimensional shape as range data with an arbitrary measuring position being an origin; and
  ii. using the range sensor while moving the origin.

9. The three-dimensional shape data recording/displaying method as set forth in claim 8, further comprising the step of:
  when a position and an error distribution of the position are obtained for the range sensor, combining the error distribution of the position of the range sensor with an error distribution of measured data.

10. The three-dimensional shape data recording/displaying method as set forth in claim 1, further comprising, after the matching step, the step of
  updating the environment model in a model updating step, wherein the model updating step comprises the steps of
  i. obtaining and resetting a new representative point and error distribution through a Kalman filter from a second coordinate value and error distribution of a newly inputted measured point, and from the representative point and the error distribution that have already been set in the first voxel.

11. A three-dimensional shape data recording/displaying device for reproducing a three-dimensional shape from coordinate values of measured points on a three-dimensional shape, wherein the three-dimensional shape data recording/displaying device comprises:
  (a) a data inputting device operably connected to input, into a computer, coordinate values on a three-dimensional shape, wherein the data inputting device comprises a range sensor;
  (b) a model structuring device operable to structure an environment model that partitions a spatial region, in which the three-dimensional shape exists, into a plurality of voxels formed from rectangular solids, of which boundary surfaces are mutually perpendicular, and the model structuring device stores positions of individual voxels;
  (c) a matching device operable to set, and record, a representative point and an error distribution of the representative point, within a first voxel corresponding to a first coordinate value, wherein the error distribution is an existence probability of the representative point, and the error distribution extends three dimensionally in the environment model, wherein the matching device is operable to set and record a plurality of representative points in the plurality of voxels, respectively, and to set and record a plurality of error distributions of the plurality of representative points in the plurality of voxels, respectively, wherein the plurality of representative points include the representative point, and the plurality of voxels include the first voxel, and the plurality of error distributions include the error distribution; and
  (d) a data transferring device operably connected to output, to an outputting device, a voxel position, the representative point, and the error distribution,
  wherein the representative point corresponds to a measured point obtained by the range sensor, and the error distribution is longer in a measuring direction of the range sensor than in a direction perpendicular to the measuring direction.

12. A three-dimensional shape measuring method for reproducing a three-dimensional shape from coordinate values of measured points on a three-dimensional shape and for outputting three-dimensional shape data, wherein the method comprises the steps of:
- (a) inputting, into a computer, coordinate values on a three-dimensional shape in a data inputting step;
- (b) structuring, in a model structuring step, an environment model that partitions a spatial region, in which the three-dimensional shape exists, into a plurality of voxels formed from rectangular solids, of which boundary surfaces are mutually perpendicular, and storing positions of individual voxels;
- (c) setting and recording, in a matching step, a representative point and an error distribution of the representative point, within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction, wherein the matching step further includes setting and recording a plurality of representative points in the plurality of voxels, respectively, and a plurality of error distributions of the plurality of representative points are set and recorded in the plurality of voxels, respectively, wherein the plurality of representative points include the representative point, and the plurality of voxels include the first voxel, and the plurality of error distributions include the error distribution; and
- (d) outputting, in an outputting step, to an outputting device at least one of the representative point, a voxel position, and the error distribution.

13. The three-dimensional shape measuring method as set forth in claim 12, further comprising, in the outputting step, the steps of outputting a position of the representative point of the first voxel to the outputting device as a three-dimensional shape measurement value; and outputting an index indicating a reliability or accuracy of the three-dimensional shape measurement value to the outputting device based on a magnitude of the error distribution within the first voxel.

14. The three-dimensional shape measuring method as set forth in claim 12, wherein, in the outputting step, when a position of the representative point of the first voxel is outputted to the outputting device as a three-dimensional shape measurement value, when a magnitude of the error distribution within the first voxel is larger than a specific reference value, then a reliability or accuracy of the measurement value is regarded to be less than a specific reference, and the three-dimensional shape measurement value for the first voxel is not outputted to the outputting device.

15. The three-dimensional shape measuring method as set forth in claim 12, further comprising, in the data inputting step, the steps of sequentially obtaining coordinate values on the three-dimensional shape as range data with an arbitrary measuring position that is an origin, and using the range sensor while moving the origin.

16. The three-dimensional shape measuring method as set forth in claim 12, further comprising after the matching step, the steps of:
- (e) updating the environment model in a model updating step, wherein the model updating step comprises retrieving a second voxel corresponding to a coordinate value of a newly inputted measured point; and
- (f) when there is no representative point within the second voxel, setting the coordinate value and the error distribution as the representative point coordinate value and error distribution.

17. The three-dimensional shape measuring method as set forth in claim 12, further comprising, after the matching step, the steps of:
- (e) updating the environment model in a model updating step, wherein the model updating step comprises retrieving a second voxel corresponding to a coordinate value of a newly inputted measured point;
- (f) when there is a representative point that has already been set within the second voxel, comparing a newly obtained error distribution and the error distribution already set within the second voxel;
- (g) when error distributions are mutually overlapping, resetting a new error distribution and a new representative point from both of the error distributions, or from both of the error distributions and the representative point already set within the second voxel and the coordinate values of the measured point newly inputted; and
- (h) when error distributions are not mutually overlapping, further partitioning hierarchically the second voxel into a plurality of third voxels so that only a single representative point exists within a single voxel.

18. The three-dimensional shape measuring method as set forth in claim 12, further comprising, after the matching step, the steps of:
- (e) updating the environment model in a model updating step, wherein the model updating step comprises the steps of
  - i. retrieving a second voxel corresponding to a coordinate value of a newly inputted measured point; and
  - ii. when at least one of the representative point and the error distribution within that second voxel is newly set, or reset, or the second voxel is further partitioned hierarchically into a plurality of third voxels, then, in the outputting step, outputting a position of a representative point of that second voxel to the outputting device as a three-dimensional shape measurement value.

19. The three-dimensional shape measuring method as set forth in claim 12, further comprising, in the outputting step, outputting, to the outputting device, as a three-dimensional shape measurement value, a position of a representative point for a second voxel in the environment model in a scope for which the position can be measured from a position of the range sensor.

20. A three-dimensional shape measuring device for reproducing a three-dimensional shape from coordinate values of measured points on a three-dimensional shape and for outputting three-dimensional shape data, wherein the three-dimensional shape measuring device comprises:
- (a) a data inputting device operably connected to input, into a computer, coordinate values on a three-dimensional shape, wherein the data inputting device comprises a range sensor;
- (b) a model structuring device operable to structure an environment model that partitions a spatial region, in which the three-dimensional shape exists, into a plurality of voxels formed from rectangular solids, of which boundary surfaces are mutually perpendicular, and the model structuring device stores positions of individual voxels;
- (c) a matching device operable to set and record a representative point and an error distribution of the representative point, within a first voxel corresponding to a first coordinate value, wherein the error distribution is an existence probability of the representative point, and the error distribution extends three dimensionally in the environment model, wherein the matching device is operable to set and record a plurality of representative points in the plurality of voxels, respectively and to set and record a plurality of error distributions of the plurality of representative points in the plurality of voxels, respectively, wherein the plurality of representative points include the representative point, and the plurality of voxels include the first voxel, and the plurality of error distributions include the error distribution; and (d) a data transferring device operably connected to output, to an outputting device, at least one of the representative point, a voxel position, and the error distribution, wherein the representative point corresponds to a measured point obtained by the range sensor, and the error distribution is longer in a measuring direction of the range sensor than in a direction perpendicular to the measuring direction.

21. A three-dimensional shape data recording/displaying method for reproducing a three-dimensional shape from coordinate values of measured points on a three-dimensional shape, wherein the method comprises the steps of:
   (a) inputting, into a computer, coordinate values on a three-dimensional shape in a data inputting step;
   (b) structuring, in a model structuring step, an environment model that partitions a spatial region, in which the three-dimensional shape exists, into a plurality of voxels formed from rectangular solids, of which boundary surfaces are mutually perpendicular, and storing positions of individual voxels;
   (c) setting and recording, in a matching step, a representative point, and an error distribution of the representative point, within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction, wherein the matching step further includes setting and recording a plurality of representative points in the plurality of voxels, respectively, and a plurality of error distributions of the plurality of representative points are set and recorded in the plurality of voxels, respectively, wherein the plurality of representative points include the representative point, and the plurality of voxels include the first voxel, and the plurality of error distributions include the error distribution; and
   (d) outputting, in an outputting step, to an outputting device at least one of the representative point, a voxel position, and the error distribution.

22. A three-dimensional shape data recording/displaying method for reproducing a three-dimensional shape from coordinate values of measured points on a three-dimensional shape, the method comprising the steps of:
   (a) inputting, into a computer, coordinate values on a three-dimensional shape in a data inputting step;
   (b) structuring, in a model structuring step, an environment model that partitions a spatial region, in which the three-dimensional shape exists, into a plurality of voxels formed from rectangular solids, of which boundary surfaces are mutually perpendicular, and storing positions of individual voxels;
   (c) setting and recording, in a matching step, a representative point and an error distribution within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction;
   (d) outputting, to an outputting device, a voxel position, the representative point, and the error distribution in an outputting step; and
   (e) updating, in a model updating step, the environment model after the matching step; wherein the model updating step further comprises the steps of
      i. retrieving a second voxel corresponding to a second coordinate value of a newly inputted measured point; and
      ii. deciding that no object exists between an origin and a measuring point, and resetting or eliminating representative points and error distributions within those voxels positioned therebetween.

23. A three-dimensional shape data recording/displaying method for reproducing a three-dimensional shape from coordinate values of measured points on a three-dimensional shape, the method comprising the steps of:
   (a) inputting, into a computer, coordinate values on a three-dimensional shape in a data inputting step;
   (b) structuring, in a model structuring step, an environment model that partitions a spatial region, in which the three-dimensional shape exists into a plurality of voxels formed from rectangular solids, of which boundary surfaces are mutually perpendicular, and storing positions of individual voxels;
   (c) setting and recording, in a matching step, a representative point and an error distribution within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction;
   (d) outputting, to an outputting device, a voxel position, the representative point, and the error distribution in an outputting step; and
   (e) updating, in a model updating step, the environment model after the matching step, wherein the model updating step further comprises the steps of
      i. retrieving a second voxel corresponding to a second coordinate value of a newly inputted measured point; and
      ii. when there is no representative point within the second voxel, setting the second coordinate value and the error distribution as a third coordinate value and error distribution of the representative point.

24. A three-dimensional shape measuring method for reproducing a three-dimensional shape from coordinate values of measured points on a three-dimensional shape and for outputting three-dimensional shape data, wherein the method comprises the steps of:
   (a) inputting, into a computer, coordinate values on a three-dimensional shape in a data inputting step;

(b) structuring, in a model structuring step, an environment model that partitions a spatial region, in which the three-dimensional shape exists, into a plurality of voxels formed from rectangular solids, of which boundary surfaces are mutually perpendicular, and storing positions of individual voxels;

(c) setting and recording, in a matching step, a representative point and an error distribution of the representative point, within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction; and (d) outputting, in an outputting step, to an outputting device at least one of the representative point, a voxel position, and the error distribution;

(e) updating the environment model in a model updating step, wherein the model updating step comprises retrieving a second voxel corresponding to a coordinate value of a newly inputted measured point; and (f) when there is no representative point within the second voxel, setting the coordinate value and the error distribution as the representative point coordinate value and error distribution, wherein steps (e) and (f) occur after the matching step.

25. A three-dimensional shape measuring method for reproducing a three-dimensional shape from coordinate values of measured points on a three-dimensional shape and for outputting three-dimensional shape data, wherein the method comprises the steps of:

(a) inputting, into a computer, coordinate values on a three-dimensional shape in a data inputting step;

(b) structuring, in a model structuring step, an environment model that partitions a spatial region, in which the three-dimensional shape exists, into a plurality of voxels formed from rectangular solids, of which boundary surfaces are mutually perpendicular, and storing positions of individual voxels;

(c) setting and recording, in a matching step, a representative point and an error distribution of the representative point, within a first voxel corresponding to a first coordinate value, wherein the error distribution is an existence probability of the representative point, and the error distribution extends three dimensionally in the environment model, wherein the representative point corresponds to a measured point obtained by using a range sensor, and the error distribution is longer in a measuring direction of the range sensor than in a direction perpendicular to the measuring direction; and (d) outputting, in an outputting step, to an outputting device at least one of the representative point, a voxel position, and the error distribution, and, in the outputting step, outputting to the outputting device, as a three-dimensional shape measurement value, a position of a representative point for a second voxel in the environment model in a scope for which the position can be measured from a position of the range sensor.

* * * * *